United States Patent [19]

Hoctor et al.

[11] Patent Number: 5,278,757
[45] Date of Patent: Jan. 11, 1994

[54] SYNTHETIC APERTURE ULTRASONIC IMAGING SYSTEM USING A MINIMUM OR REDUCED REDUNDANCY PHASED ARRAY

[75] Inventors: Ralph T. Hoctor, Wilmington, Del.; Saleem A. Kassam, Bala Cynwyd, Pa.

[73] Assignee: The Trustees of The University of Pennsylvania, Philadelphia, Pa.

[21] Appl. No.: 792,789

[22] Filed: Nov. 15, 1991

[51] Int. Cl.⁵ ............... G06F 15/00; G01N 29/00
[52] U.S. Cl. ............... 364/413.25; 364/413.13; 128/660.07; 128/661.01
[58] Field of Search .............. 364/413.25, 413.13; 128/660.07, 661.01

[56] References Cited

U.S. PATENT DOCUMENTS

| | | | |
|---|---|---|---|
| 4,543,829 | 10/1985 | Lerch | 73/626 |
| 4,553,437 | 11/1985 | Luthra et al. | 73/602 |
| 4,604,697 | 8/1986 | Luthra et al. | 364/414 |
| 5,111,823 | 5/1992 | Cohen | 128/660.07 |

OTHER PUBLICATIONS

Greene et al., "Sparse Array Performance", *Journal of the Acoustical Soc. of Am.*, vol. 63, pp. 1866–1872, (Jun. 1978).

Haubrich, "Array Design", *Bulletin of the Seismological Soc. of Am.*, vol. 58, pp. 977–991, (Jun. 1968).

Ishiguro, "Minimum Redundancy Linear Arrays for a Large Number of Antennas", *Radio Science*, vol. 15, pp. 1163–1170, (Nov. 1980).

S. A. Kassam & R. Hoctor, "The Unifying Role of the Coarray in Aperture Synthesis for Coherent and Incoherent Imaging", *Proceedings of the IEEE*, vol. 78, pp. 735–752, (Apr. 1990).

P. N. Keating et al., "Holographic Aperture Synthesis Via a Transmitter Array", *Acoustical Holography*, vol. 6, pp. 485–506 (1975).

(List continued on next page.)

*Primary Examiner*—Roy N. Envall, Jr.
*Assistant Examiner*—Gita Shingala
*Attorney, Agent, or Firm*—Woodcock Washburn Kurtz Mackiewicz & Norris

[57] ABSTRACT

A synthetic aperture ultrasonic imaging system for imaging a target with a resolution limited by a designated aperture. A phased array of nonuniformly spaced ultrasound transducers having an average inter-transducer spacing which is greater than a $\lambda/2$ Nyquist spacing for the transducers is used for imaging in a manner so as to either obtain a desired point spread function which is unattainable by a single image taken by the nonuniformly spaced transducers or to provide coarray equivalence to a phased array of transducers which are uniformly spaced at the $\lambda/2$ Nyquist spacing for the designated aperture. Coarray equivalence makes possible the technique of applying amplitude weightings to each of the nonuniformly spaced ultrasound transducers during transmit and receive modes and by forming a number of component images which when added together form a sum image substantially equivalent to a single image formed by a scan beam of the uniformly spaced transducers with the designated aperture. The complex values of the resulting component images are then added on a point by point basis, preserving phase, such that a point spread function of the sum image is substantially equivalent to the desired point spread function of the single image formed by the uniformly spaced transducers with the designated aperture. Minimization techniques may also be applied so that the nonuniform array can have the minimum number of transducers while still providing the desired point spread function for the designated aperture. Thus, the invention enables significantly fewer transducers to be used for ultrasonic imaging without sacrificing any image quality.

32 Claims, 20 Drawing Sheets

OTHER PUBLICATIONS

J. K. Kreuzer, "A Synthetic Aperture Coherent Imaging Technique", *Acoustical Holography*, vol. 3, pp. 287-315 (1971).

A. Macovski, "Ultrasonic Imaging Using Arrays", *Proc. IEEE*, Special Issue on Acoustic Imaging, vol. 67, pp. 484-495, Apr. 1979.

Moffet, "Minimum Redundancy Linear Arrays", *IEEE Trans. Antennas and Prop.*, vol. AP-16, pp. 172-175, (Mar. 1968).

K. Nagai, "Synthetic Aperture Ultrasonic Imagery", *Advances in Electronics and Electron Physics*, vol. 70, pp. 215-314, 1988.

K. Nitadori, "Synthetic Aperture Approach to Multi-Beam Scanning Acoustical Imaging", *Acoustical Holography*, vol. 6, pp. 507-523, 1975.

Sherrill et al., "In Situ Optimal Reshading of Arrays with Failed Elements", *IEEE Journal of Oceanic Engineering*, vol. OE-12, pp. 155-162 (Jan. 1987).

J. L. Sutton, "Underwater Acoustic Imaging", *Proc. IEEE*, Special Issue on Acoustic Imaging, vol. 67, pp. 554-566, Apr. 1979.

W. H. Wells, "Acoustical Imaging with Linear Transducer Arrays", *Acoustical Holography*, vol. 2, pp. 87-103 (1969).

Zrnic et al., "A Switched Pattern Radar Antenna Array", *IEEE Trans. on Antennas and Prop*, vol. AP-35, pp. 1104-1110, (Oct. 1987).

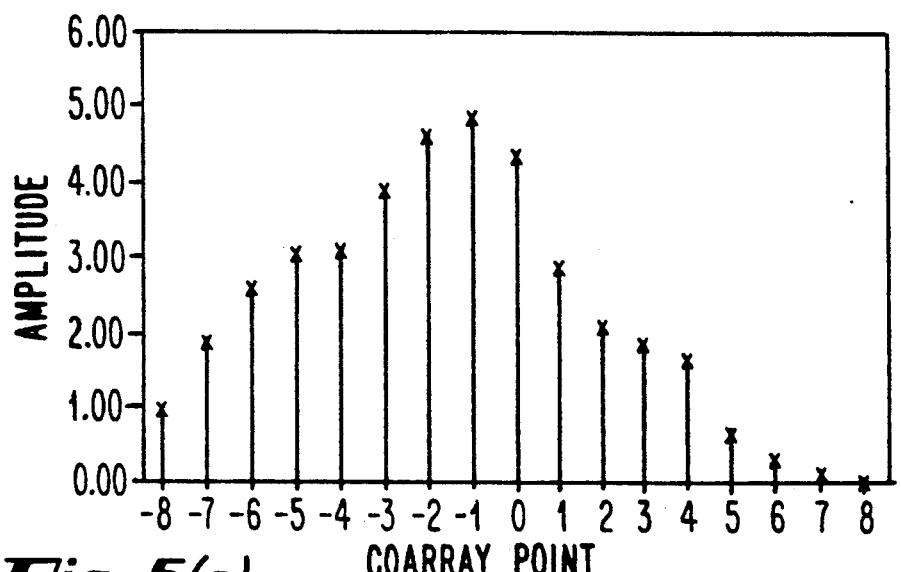
_Fig. 5(c)_
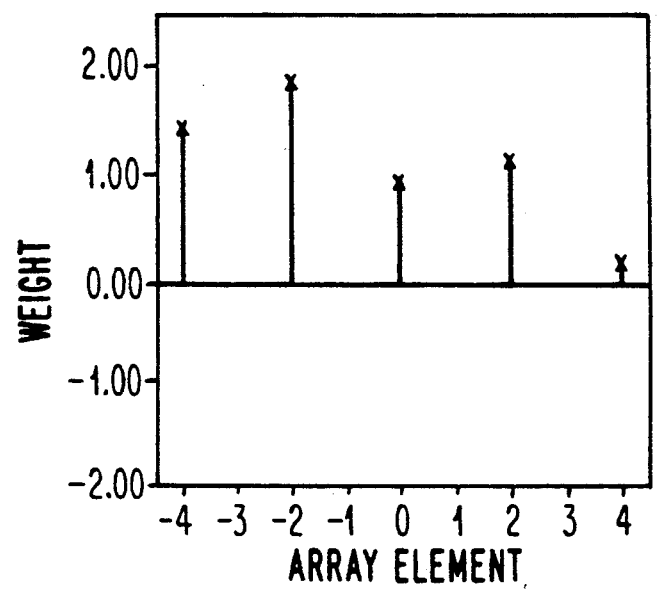
_Fig. 5(d)_
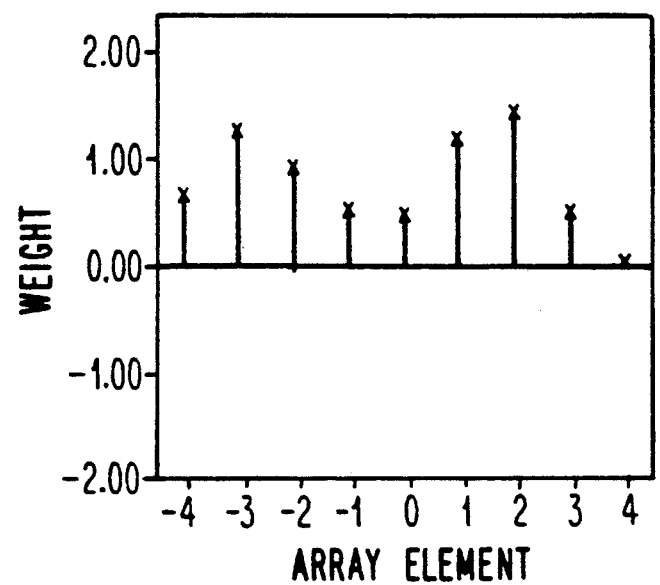
_Fig. 5(e)_

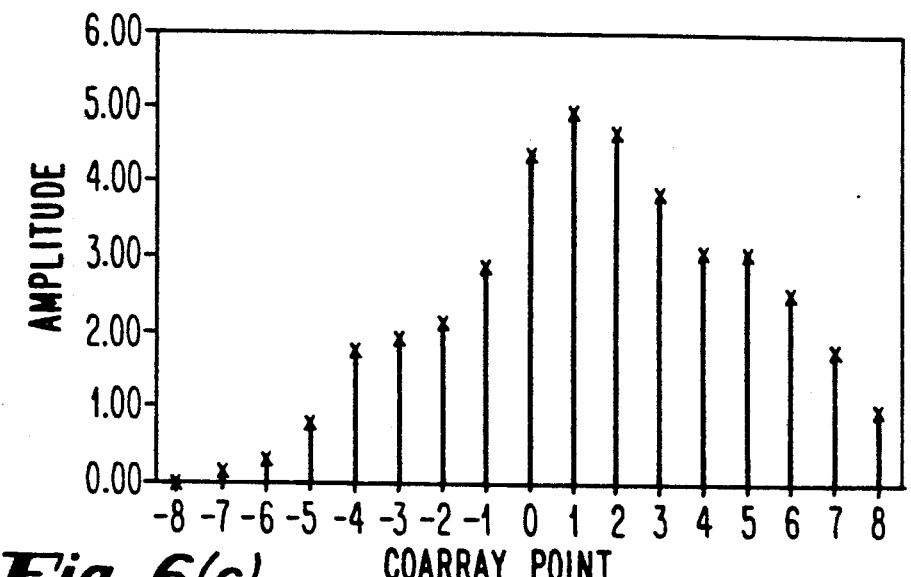
_Fig. 6(c)_
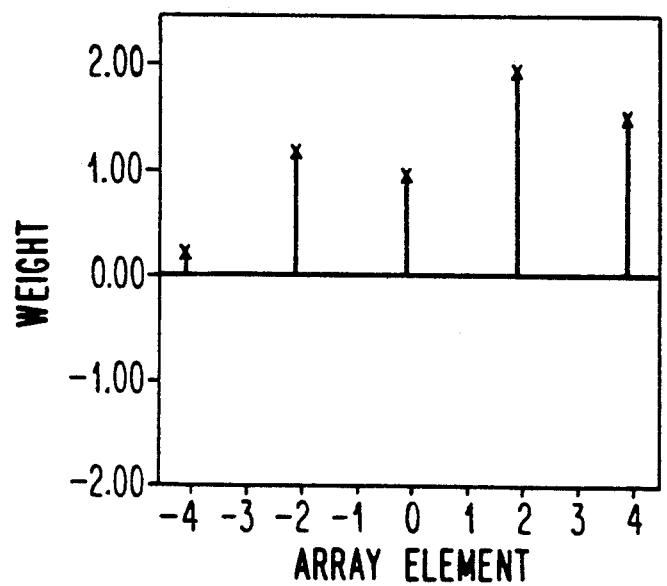
_Fig. 6(d)_
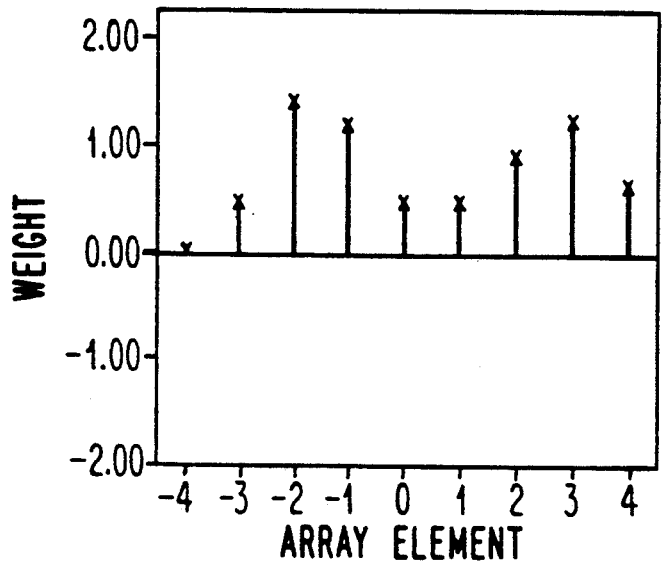
_Fig. 6(e)_

| N | L | MRA | Ra |
|---|---|---|---|
| 4 | 5 | .1.2.1. | 1.778 |
| 5 | 7 | .1.2.2.1. | 1.923 |
| 6 | 9 | .1.2.2.2.1. | 2.118 |
| 7 | 11 | .1.1.3.3.1.1.<br>.1.2.2.2.2.1. | 2.334 |
| 8 | 14 | .1.1.3.3.3.1.1.<br>1.2.1.5.1.2.1. | 2.370 |
| 9 | 17 | .1.1.3.3.3.3.1.1. | 2.455 |
| 10 | 21 | .1.2.1.5.2.5.1.2.1. | 2.439 |
| 11 | 23 | .1.1.1.4.4.4.2.3.1.1.<br>.1.1.1.4.4.4.4.1.1.1.<br>.1.1.3.2.4.4.2.3.1.1.<br>.1.1.3.3.3.3.3.3.1.1.<br>.1.2.1.2.5.2.5.1.2.1.<br>.1.2.1.5.2.2.5.1.2.1. | 2.689 |
| 12 | 28 | .1.2.1.5.2.5.2.5.1.2.1.<br>.1.2.2.1.7.1.7.1.2.2.1. | 2.618 |

*Fig. 11*

| N | L | MRSA | Ra |
|---|---|---|---|
| 13 | 33 | .1.2.1.5.2.5.5.2.5.1.2.1. | 2.600 |
| 14 | 37 | .1.2.1.5.2.5.4.5.2.5.1.2.1. | 2.685 |
| 15 | 41 | .1.2.1.1.3.6.6.6.6.3.1.1.2.1. | 2.778 |
| 16 | 47 | .1.2.1.1.3.6.6.6.6.6.3.1.1.2.1. | 2.753 |
| 17 | 53 | .1.2.1.1.3.6.6.6.6.6.6.3.1.1.2.1. | 2.752 |
| 18 | 59 | .1.2.1.1.3.6.6.6.6.6.6.6.3.1.1.2.1. | 2.769 |
| 19 | 65 | .1.2.1.1.3.6.6.6.6.6.6.6.6.3.1.1.2.1. | 2.798 |
| 20 | 71 | .1.2.1.1.3.6.6.6.6.6.6.6.6.6.3.1.1.2.1. | 2.837 |

*Fig. 12*

SYNTHETIC APERTURE ULTRASONIC IMAGING SYSTEM USING A MINIMUM OR REDUCED REDUNDANCY PHASED ARRAY

STATEMENT OF GOVERNMENT INTEREST

This invention was made with government support under contract N00014-89-J-1538 awarded by the Department of the Navy. The government has certain rights in the invention.

BACKGROUND OF THE INVENTION

1. Field of the Invention

The present invention relates to ultrasonic imaging systems, and more particularly, to ultrasonic imaging systems and methods which create the effect of imaging with a filled linear array while making use of a reduced or minimum number of linear array elements or processing channels.

2. Description of the Prior Art

In the imaging of coherent scenes composed of distributions of reflectors, active (transmit/receive) imaging arrays have been used in the prior art. In such imaging systems, the imaging array is often composed of linear arrays of elements which can function as both transmitters and receivers for, e.g., far-field, active imaging using narrowband radiation. As known to those skilled in the art, an image may be obtained with such a system by forming transmit and receiving beams and scanning them together across the scene Such beams are typically characterized by their beam patterns, where the beam pattern of the array is defined as its complex gain as a function of direction of arrival of incident radiation. Examples of imaging systems making use of such arrays may be found in the fields of medical ultrasound and underwater acoustic imaging.

As known by those skilled in the art, ultrasonic imaging is a technique used to form an image of the interior of a solid, opaque object by use of high-frequency, low amplitude mechanical vibrations (ultrasound). As just noted, this technique has applications in medical and underwater acoustic imaging. In medical imaging, images of small parts of the body (valves of the heart, for example) are formed and displayed. Such applications put a premium on high image resolution and overall image quality. For such reasons, it has been proposed to use phased arrays of transducer elements and signal processing techniques in order to obtain higher quality images from a given ultrasound transducer and instrument than would ordinarily be obtainable from that equipment. However, to date, sufficient techniques have not been developed.

Many prior art ultrasonic imaging instruments make use of single-element, mechanically scanned transducers, where the transducer element is a source of ultrasound which may also function as a receiver. In a mechanically scanned system, this element is pointed in a direction of interest by mechanical means and then is excited by a high-voltage pulse which causes it to emit ultrasound. Because the aperture is typically large compared to the wavelength of the emitted sound, the strongly insonified region is limited to a small volume of space directly in front of the transducer. This region is known as the afore-mentioned "beam". The echoes from the transmission are, in turn, sensed by the transducer element and recorded. Then, when the beam has been scanned over all the directions of interest, the recorded echoes may be combined to create an image which is displayed on a display device such as a CRT. In a phased array ultrasound instrument, multiple elements of this type are used. In many such systems, these elements are deployed side-by-side in a line to form a linear array, while in other systems the elements are made in the shape of continuous rings of annuli of varying radius.

As noted above, a beam may be formed in an array imaging system by transmitting (or receiving) with all of the elements at once. When a linear phased array is used, scanning of the beam is accomplished by varying time delays imposed on the measured echoes of the different elements, while the annular phased array is mechanically scanned and is usually focused by imposition of the delays on the transducer elements In the case of the linear phased array, the standard method of image formation is thus beam forming and scanning.

There are several known applications of phased arrays in medical ultrasound at the present time. In abdominal imaging (pre-natal, for example), large phased arrays are sometimes used, although the most common mode of operation is that of the large, unsteered linear array which translates the path of the sound through the body by subarray selection. Phased arrays are also used in cardiac imaging, but they are restricted in their physical size by the requirement that imaging be done through the spaces between the ribs. Phased arrays are also used in most color flow mappers, which image moving blood using a Doppler shift to project motion, because, unlike moving transducers, phased arrays can illuminate the same volume over and over again. Annular arrays are also widely used; however, their primary value lies in the fact that they can be dynamically focused when receiving an ultrasound echo.

Active imaging systems of the type to which the present invention is directed may be characterized by their point spread functions (PSF). The PSF is simply the image produced by the system for a point target or point reflector, and since any linear imaging system can be characterized by its response to a point reflector, the PSF is the key determinant of image quality. In other words, the quality of the final image is determined by the PSF. Because of this feature of active imaging systems, a method is desired for synthesizing a desired PSF in an image obtained with a given array used for active imaging. The desired PSF must belong to the set of realizable PSFs associated with the aperture, for the set of realizable PSFs for a given aperture may be larger than the set of PSFs which can be obtained by the standard method of transmit/receive beam forming and scanning. As will be described herein, images with these PSFs can be synthesized by the use of image addition, which is referred to herein as image synthesis or aperture synthesis. Such synthetic aperture active imaging systems using arrays have been a topic of investigation for some time, and various schemes have been proposed which are motivated by the desire to create the effect of a large array without using a large number of array elements. However, most of the schemes in the prior art, such as those described by W. H. Wells in "Acoustical Imaging With Linear Transducer Arrays," *Acoustical Holography*, Vol. 2, pp. 87-103 (1969), and by P. N. Keating et al. in "Holographic Aperture Synthesis Via a Transmitter Array," *Acoustic Holography*, Vol. 6, pp. 485-523 (1975), were devised on an ad hoc basis and do not allow for specification of a desired PSF. Additionally, such schemes typically deal with planar arrays, and the applicability of the idea of redundancy to linear active imaging arrays has not been explicitly recognized and exploited in the prior art.

Accordingly, the present invention has been designed to specifically apply the idea of redundancy to linear active imaging arrays so as to allow for improved imaging efficiency, and as will be described herein, this application has led to a significant advancement in the acoustical imaging art.

SUMMARY OF THE INVENTION

The present invention relates to improved designs of a phased array ultrasonic imaging system which uses an active minimum redundancy array (MRA) or reduced redundancy array (RRA). In order to obtain the effect of using the filled array of the same length, a reduced redundancy array in accordance with the invention must be used in a synthetic aperture imaging system. In general, this requires that multiple images be formed and added together in such a way that the phase of the echoed ultrasound is taken into account.

As used herein, a reduced redundancy phased array is a linear (or planar) array of ultrasound transducers, which is, in general, nonuniformly spaced and which has an average interelement spacing which is greater than the standard Nyquist-criterion-based $\lambda/2$ spacing, where $\lambda$ is the nominal center frequency of the ultrasound pulse. What distinguishes the reduced redundancy array of the invention from an arbitrary thinned array is that it retains coarray equivalence, as described by the present inventors in an article entitled "The Unifying Role of the Coarray in Aperture Synthesis for Coherent and Incoherent Imaging," *Proceedings of the IEEE*, Vol. 78, pp. 735-752 (April, 1990), the contents of which is hereby incorporated by reference in its entirety, to a standard phased array composed of uniformly deployed elements spaced at $\lambda/2$. The importance of this is that the reduced redundancy array of the invention can be used to form an image which is identical to one formed by the standard array of the same overall length (or exterior dimensions, in the case of a planar array). This is advantageous because the reduced redundancy array is composed of fewer elements than the filled array of the same size. A minimum redundancy phased array, on the other hand, is a reduced redundancy phased array which is composed of the (unique) minimum number of actual elements for an array of that length or exterior dimension. The use of the phrase "reduced redundancy" implies that some of the elements of the original filled array are unnecessary in the sense that an image can be formed without some elements yet still have the same characteristics as an image formed using those elements. The use of the phrase "minimum redundancy" herewith thus implies that the redundancy has been reduced to a lower limit.

As will be clear from the following detailed description, the present invention includes several novel features including the use of an active (transmit/receive) minimum redundancy phased array. Although this concept is known for passive (receive only) arrays such as those used for radio astronomy, the present invention is the first known attempt to successfully apply this technique to active (transmit/receive) arrays. In addition, the present invention is believed to provide the first device to incorporate the idea that the properties of minimum redundancy arrays may be used to design or identify specific arrays of a given length. This is also true for reduced redundancy arrays of a given length and number of elements. Also, in order to synthesize a desired image, the individual component images made in accordance with the invention are added and preferably have the proper characteristics as determined by their point spread functions (PSF). These characteristics may be controlled at the time of image formation by the (in general complex) amplitude weights imparted to the individual array elements, both on transmit and on receive. A method is also disclosed for computing the necessary weights for the formation of each component image given the particular array, the number of component images and the desired PSF of the final synthesized, image. Other novel features will be apparent to those skilled in the art from the following detailed description.

The present invention thus makes use of fewer array elements than does a filled linear array of the same length. A key concept for understanding the technique of the invention is the concept of a sum coarray described in the aforementioned paper of the present inventors. In the case of transmit/receive arrays, the sum coarray is defined as the set of all pairwise sums of element positions in the array, while in the case of distinct transmit and receive arrays, it is defined as the set of all pairwise sums of transmit element positions and receive element positions. The coarray determines the set of PSFs which can be realized, as will be explained below. The sum coarray also provides a method for defining the redundancy of an active array imaging system. Any thinned array which can be formed from a filled, uniformly spaced linear array by the removal of some number of elements, and which has the same coarray as the filled array, can be used to obtain images with the same PSFs as those available using the original array in accordance with the techniques of the invention. Another approach to the reduction of processing hardware in accordance with the invention is through the partitioning of the array into subarrays which are used independently as active imaging arrays. In general, both of these types of aperture synthesis require the imposition of an amplitude taper on the transmit and receive arrays, although constant amplitude phase-only array element weights may also be used.

In accordance with the above concepts, a preferred embodiment of the present invention relates to a synthetic aperture ultrasonic imaging system for imaging a target with a resolution limited by a designated aperture. A phased array of nonuniformly spaced ultrasound transducers having an average inter-transducer spacing which is greater than a $\lambda/2$ Nyquist spacing for the transducers is used for imaging in a manner so as to either obtain a desired point spread function which is unattainable by a single image taken by the nonuniformly spaced transducers or provide coarray equivalence to a phased array of transducers which are uniformly spaced at the $\lambda/2$ Nyquist spacing for the designated aperture. Coarray equivalence makes possible the technique used herein of applying different amplitude weightings to each of the nonuniformly spaced ultrasound transducers during transmit and receive modes and forming a number of component images which when added together form a sum image substantially equivalent to a single image formed by a scan beam of the uniformly spaced transducers with the designated aperture. The complex values of the resulting component images are then added on a point by point basis, preserving phase, such that a point spread function of the sum image is substantially equivalent to the desired point spread function of the single image formed by the uniformly spaced transducers with the designated aperture. Minimization techniques may also be applied so that the nonuniform array can have the minimum number of transducers while still providing the desired point spread function for the designated aperture. Thus, the invention enables significantly fewer transducers to be used for ultrasonic imaging without sacrificing any image quality.

BRIEF DESCRIPTION OF THE DRAWINGS

The foregoing and other novel features and advantages of the invention will become more apparent and more readily appreciated by those skilled in the art after consideration of the following description in conjunction with the associated drawings, of which:

FIGS. 5(a) and 6(a) illustrate the PSF amplitude while

FIGS. 5(c) and 6(c) illustrate the coarray weighting functions of the two images shown in FIGS. 5(a), 5(b), 6(a) and 6(b).

FIGS. 5(d), 5(e), 6(d) and 6(e) illustrate the transmit (FIGS. 5(d) and 6(d)) and receive (FIGS. 5(e) and 6(e)) array element weights for the two images shown in FIGS. 5(a), 5(b), 6(a) and 6(b).

FIGS. 11 and 12 illustrate a list of minimum redundancy arrays (MRAs) for active imaging in accordance with the invention.

DETAILED DESCRIPTION OF THE PRESENTLY PREFERRED EMBODIMENTS

Preferred embodiments of the invention will now be described in detail with reference to FIGS. 1-16. Those skilled in the art will appreciate that the description given herein with respect to those figures is for exemplary purposes only and is not intended in any way to limit the scope of the invention. All questions regarding the scope of the invention may be resolved by referring to the appended claims.

The Coarray in Active Imaging

This section will describe the theoretical and mathematical basis of the techniques used in accordance with the invention.

Figure 1:
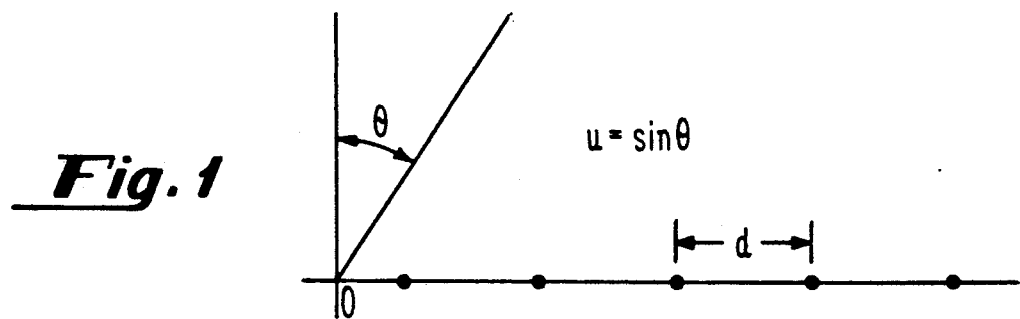
FIG. 1 illustrates a linear array with a uniform spacing d between elements and an angle $\theta$ between the broadside direction and the direction in which the array response is to be described.

If an antenna array is to be used in an active imaging system, transmit and receive beams may be formed and scanned over the scene. The transmit (T(u)) and receive (R(u)) beam patterns (steered to broadside) may be written as:

$$R(u) = \sum_{n=1}^{N} r_n e^{jk_0 u x_n} \qquad \text{Equation (1a)}$$

and $$T(u) = \sum_{n=1}^{N} t_n e^{jk_0 u x_n}, \qquad \text{Equation (1b)}$$

where $k_0 = 2\pi/\lambda_0$ is the wave number of the narrowband radiation of wavelength $\lambda_0$, $x_n$ is the position of the $n^{th}$ antenna element, $t_n$ and $r_n$ are complex-valued weights applied to the $n^{th}$ array element on transmit and receive, respectively, and the beam patterns are expressed as functions of the angular variable $u = \sin\theta$, where $\theta$ is the angle between the broadside direction and the direction in which the array response is to be described as illustrated in FIG. 1. As known to those skilled in the art, the point spread function (PSF) of such an imaging system is the product $T(-u) R(-u)$, where the minus signs are the result of scanning the transmit and receive beams together over the scene. In particular, since $T(-u)$ and $R(-u)$ are the Fourier transforms of the aperture weighting functions $w_t(x)$ (transmit) and $w_r(x)$ (receive):

$$w_t(x) = \sum_{n=1}^{N} t_n \delta(x - x_n) \quad \text{Equation (2a)}$$

and $$w_r(x) = \sum_{n=1}^{N} r_n \delta(x - x_n), \quad \text{Equation (2a)}$$

respectively, the inverse transform of the PSF is the convolution of $w_t(x)$ and $w_r(x)$. If this convolution is denoted by $w_c(y)$, then:

$$w_c(y) = \sum_{n=1}^{N} \sum_{m=1}^{N} t_n r_m \delta(y - (x_n + x_m)). \quad \text{Equation (3)}$$

The set of support of this convolution is referred to herein as the sum coarray, where $w_c(y)$ itself is referred to as the coarray weighting function. The sum coarray thus may be defined as the set $\{y \mid y = x_n + x_m, m,n = 1,2, \ldots, N\}$, where, in the most general case, the transmit array consists of elements located at the points $x_n$ for $n = 1, \ldots, N$, and the receive array consists of elements located at the points $z_m$ for $m = 1, \ldots, M$; hence, the sum coarray is given by the set $\{y \mid y = x_n + z_m, n = 1, \ldots, N, m = 1, \ldots, M\}$.

The term "coarray" was first introduced in the context of passive imaging by Haubrich in an article entitled "Array Design," *Bulletin of the Seismological Soc. of Am.*, Vol. 58, pp. 977–991 (June 1968); however, in that context, the term "coarray" refers to what is herein called the difference coarray, which is the set $\{y \mid y = x_n - x_m\}$. The terms "sum coarray" and "difference coarray" were introduced in the aforementioned article to the present inventors, the contents of which was incorporated by reference above. However, the idea of the sum coarray weighting function was in essence also featured in an early formulation of aperture synthesis under the name "synthetic aperture convolution function" in an article by J. K. Kreuzer entitled "A Synthetic Aperture Coherent Imaging Technique," *Acoustical Holography*, Vol. 3, pp. 287–315 (1971).

The present inventors have discovered that since the coarray weighting function is the inverse transform of the PSF, any two active imaging systems with the same coarray weighting functions will produce exactly the same image of a given reflectivity distribution. Therefore, if any arbitrary weighting may be applied to the coarray of a given array, then it can be used to produce the same image as any other array which has the same coarray. A number of examples of different apertures which possess the same coarray will be described herein, and any two such apertures will be referred to herein as coarray equivalent to one another.

For a given set of array element locations, there may be many different pairs of element locations which sum to the same value. This is how element redundancy arises in active imaging arrays, for a desired coarray weighting value at such a coarray point may be supplied in the absence of some of the elements. The array geometries considered herein are less redundant than a filled linear array with the same main lobe resolution (which is to say with the same overall length), and, as noted above, such arrays will be referred to as reduced redundancy arrays (RRA). As will be shown below, RRAs which are coarray equivalent to the filled array can be used to produce images with any PSF which can be obtained in an image formed with the filled array.

Image Synthesis

The objective of the image synthesis technique herein described is to modify the PSF of a given imaging array to obtain a desired PSF. There are two specific methods of such image synthesis. The first is called the direct method and consists of transmitting with each array element in turn while receiving with the entire array. The measured values of the reflected radiation are then mathematically combined to form a synthetic image. Such a method has been described, for example, in Luthra et al. U.S. Pat. No. 4,604,697. The second method is referred to herein as image addition. In this method, several images are formed by the standard method described above while different array weights are used in the creation of each image. The use of different array weights in each image has the effect of realizing a different PSF in each image. When these images are added together in a point-by-point fashion, it has the effect of adding their PSF's together, with the sum of the PSFs being the PSF of the sum image. Since image addition is the presently preferred image synthesis technique, the theoretical basis of image addition in accordance with the invention will now be described.

In accordance with the invention, an arbitrary weighting can always be applied to the coarray of a filled linear array. As described above, the coarray weighting function is the convolution of the transmit and receive array weighting functions, so the Z-transform of the coarray weighting function is the product of the Z-transforms of the two array weighting functions. Since Z-transforms are polynomials over the complex field, and such polynomials are always factorable into monomials by the Fundamental Theorem of Algebra, the Z-transform of any arbitrary coarray weighting can always be factored into the Z-transforms of transmit and receive weightings. This implies that the filled array can impose any weighting on its coarray by use of the standard method of beam forming and scanning. On the other hand, this is not necessarily possible in a single use of the array for low redundancy arrays, even when they are coarray equivalent to the filled array (as when the number of points of the coarray exceeds the sum of the numbers of transmit and receive elements). This observation raises the question of how an arbitrary coarray weighting is to be imposed in such an array imaging system and will now be described.

Let $a(u)$ be the complex-valued reflectively density function of an arbitrary coherent reflectivity distribution, where u is the reduced angular variable $\sin\theta$ as shown in FIG. 1. An image, $\tilde{a}(u)$, is formed by an active imaging system in the form of a convolution between $a(u)$ and the point spread function:

$$\tilde{a}(u) = \int_{-1}^{1} a(v) P(u - v) dv, \quad \text{Equation (4)}$$

where u is the beam steering direction and it is assumed that $a(u)$ is zero outside of the visible region.

A convenient way of applying an arbitrary weighting to the coarray of a given system is by way of image addition. This technique has been used before with the transmit/receive array systems as described by Keating et al., but its relationship to coarray weighting was first explicitly put forward by the present inventors in the afore-mentioned article incorporated by reference. It is based on the simple observation that when images are added together, the effect is to add their PSFs together. Thus, if $\bar{a}_k(u)$ is the $k_{th}$ of K component images, and its PSF is $P_k(u)$, then the sum of the K component images may be written as:

$$\bar{a}(u) = \sum_{k=1}^{K} \bar{a}_k(u) = \int_{-1}^{1} \bar{a}(v) \sum_{k=1}^{K} P_k(u - v) dv \qquad \text{Equation (5)}$$

and the coarray weighting associated with the sum image is:

$$w_c(y) = \sum_{k=1}^{K} w_c(y;k) \qquad \text{Equation (6)}$$
$$= \sum_{n=1}^{N} \sum_{m=1}^{N} \left[ \sum_{k=1}^{K} t_n(k) r_m(k) \right] \delta(y - (x_n + x_m)),$$

where $w_c(y;k)$ is the coarray weighting associated with the $k_{th}$ image and $t_n(k)$ and $r_m(k)$ are the transmit and receive weights associated with the $n^{th}$ and $m^{th}$ array elements, respectively, for formation of the $k^{th}$ image. This expression is suite similar to Equation (3) as derived above. It is also clear that if K is large enough, any coarray weighting can be imposed by way of this technique. For example, if the $k^{th}$ component image were formed using all transmit and receive weights equal to zero except $t_n(k)$ and $r_m(k)$, then the value of the coarray weighting associated with the point $y = x_n + x_m$ be determined by the $k_{th}$ image. If one image of this kind were formed for each distinct coarray point, an arbitrary coarray weighting could be realized. Of course, it may be possible to impose an arbitrary coarray weighting with far fewer component images, but to do so it is necessary to have a method for calculating the transmit/receive array weights used in forming the necessary component images.

It is important to note that both the transmit and receive weightings should differ from image to image in order for the action of image addition to be meaningful. For example, it is possible to propose a system making use of two distinct receive array weightings, $r_m(1)$ and $r_m(2)$, for $m = 1, \ldots, N$, and only one transmit array weighting, $t_n$, for $n = 1, \ldots, N$, for an N-element transmit/receive array. However, in this case, $t_n$ would come out of the sum over "k" in Equation (6); therefore, the addition of these two images corresponds to the use of a single set of transmit and receive array weights to form a single image. That is, the same effect as the image addition above could be achieved by simply applying the sum of the receive weights to the receive array.

To calculate a set of component image transmit/receive array weights, a desired coarray weighting (or equivalently, a desired PSF) is selected which is to be synthesized using a second, presumably less redundant, array. The problem is simply to obtain a set of transmit/receive array weights for some number of component images to be formed with the second array in such a way that the sum of the component images has the desired coarray weighting. This operation is preferably performed in accordance with the invention by a simple minimization technique.

In particular, the first step of the procedure consists of choosing a set of initial transmit and receive array weights for each of K component images to be taken. The initial weights define a coarray weighting which is the sum of the coarray weightings of K individual images. The squared modulus of the difference between the sum of the component coarray weightings associated with the current set of array weights and the desired coarray weighting are then numerically minimized. If there are a sufficient number of degrees of freedom in the assignment of the array weights of the K component images, the difference maybe reduced to zero so as to produce an exact synthesis of the desired PSF. In the case that such a number of degrees oz freedom do not exist (because of an insufficient number of component images), however, the desired PSF is only approximated. An exact synthesis in such a case would require a larger number of component images and requires a procedure referred to herein as numerical coarray matching.

Figure 2A:
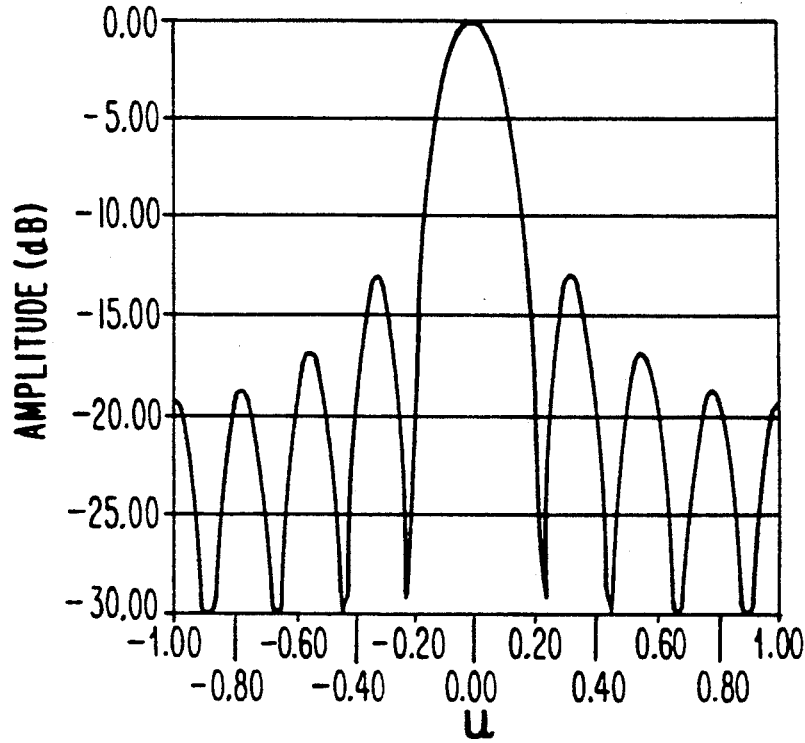
FIG. 2(a) illustrates the PSF amplitude of a filled, 9-element array using unity element weights on transmit and receive, where $d=\lambda_0/2$.
Figure 2B:
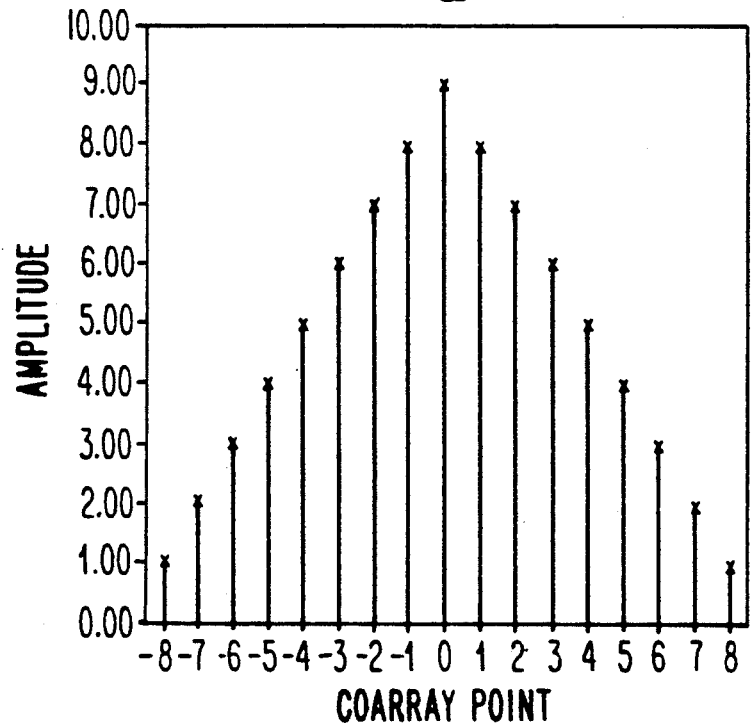
FIG. 2(b) illustrates the coarray weighting function associated with the element weighting of FIG. 2(a).

For reference, FIG. 2(a) illustrates the PSF amplitude of a typical filled linear N-element (N=9) phased array with interelement spacing $d = \lambda_0/2$ when this array is imparted uniform (unity) weights on transmit and receive. (Different PSFs may be obtained from this array by use of different weights on transmit and receive, and these weights may be synthesized by the techniques described below.) The coarray weighting function associated with this element weighting is shown in FIG. 2(b). Az shown, the PSF is the familiar "sinc-squared" pattern, having a high central portion known as the main lobe pointed in the direction of interest and side lobes. The triangular coarray weighting function is sometimes called a Bartlett weighting. In general, a desirable PSF for imaging is one with a narrow main lobe and side lobes which are small compared to the main lobe. This particular PSF is convenient for the purpose of emphasizing that the effect of a filled, linear array can be achieved by the array systems of the following examples. However, those skilled in the art will appreciate that the technique of image synthesis herein described is in no way limited to the synthesis of any particular PSF, as some of the following examples will demonstrate As used herein, if a filled linear array of N elements is represented by a set of consecutive integers, $A_{f,N} = \{0, 1, \ldots, N-1\}$ represents the distance in units of interelement spacing of each element from an origin at the end array element. The sum coarray of the filled array represented by $A_{f,N}$ may also be represented as the set of integers $C_{f,N} = (0, \ldots, 2N-2)$, which is the set of all sums of two elements of $A_{f,N}$.

It can easily be shown that some desirable PSFs can be obtained for certain arrays only by aperture synthesis. This is particularly true for sparse arrays which are derived from filled arrays by the deletion of some elements. The present invention makes use of the technique of image synthesis to overcome the effects of reducing the number of elements in a given array without decreasing its size (by removing elements from the array's interior). The primary effect of such a thinning of the array is to raise the levels of the side lobes. The benefit which is derived from thinning the array is the reduction of its cost, for not only are the number of elements reduced, but the amount of necessary electronics is reduced since each array element requires its own processing channel. This also achieves a reduction in the size of the imaging device. This aspect of the invention will be described in more detail in the following sections.

Image Synthesis Using Thinned Linear Arrays

As previously described, the imaging systems of the invention are based on the use of thinned linear arrays which are the sum coarray equivalent to a filmed linear array, where a thinned array is defined as the array which results from the removal of some elements of a filled, uniformly-spaced array with interelement spacing d. The thinned array can occur either by accident (element failure) or by design. If it occurs by design, the usual motivation behind it is to make a trade-off between the cost of the array and its performance. When elements are removed from an array without changing the class of image PSFs which that array can form, then the array's redundancy has been reduced. The redundancy of an array as herein described may be thought of as the degree to which it contains element pairs which can be eliminated without changing the coarray. Several types of reduced redundancy active imaging arrays will be described below.

As noted above, passive, receive-only systems may be described in terms of the difference coarray formalism. The difference coarray is the set of all differences or lags between array element locations. For arrays which are difference coarray equivalent to a filled array, the redundancy $R_p$ may be measured as:

$$R_p = \frac{N(N-1)}{\text{Number of points in difference coarray} - 1}, \quad \text{Equation (7)}$$

where N is the number of elements in the array. The quantity $N(N-1)+1$ is the number of differences which can be formed from a set of N numbers. Thus, the redundancy measure of Equation (7) essentially represents the ratio of the largest number of distinct coarray points which can be formed using N elements to the actual number of coarray points. If there are more ways of arriving at coarray points than there are coarray points, then some of the lags in the array must be redundant. When applied to a completely nonredundant array which is coarray equivalent to a filled array, the ratio attains its minimum value of unity. An example of such an array is the 3-element Arsac array. A more redundant passive array will produce a higher value of $R_p$.

A redundancy measure for active arrays has been defined by the present inventors in an analogous manner. For an active array, the number of ways in which sum coarray points can be formed is $N_r N_t$, where $N_r$ is the number of receive elements and $N_t$ is the number of transmit elements (transmit/receive elements are counted as both). This quantity is analogous to the quantity $N(N-1)+1$ for passive arrays. Using this insight, a measure of redundancy $R_a$ for active arrays can be defined which is consistent with that given for $R_p$ above, that is:

$$R_a = \frac{N_r N_t}{\text{Number of points in sum coarray}}, \quad \text{Equation (8)}$$

where $R_a$ is the ratio of the largest number of points which a sum coarray can have (given $N_t$ and $N_r$) to the actual number of points in the sum coarray. If every pair of transit and receive elements contributes to the formation of only one coarray point, then the array is completely nonredundant, and the minimum value of $R_a$ is unity. $R_a$ increases with the degree of redundancy of the array.

Thinned Transmitter Arrays

Array imaging systems related to the N-element line array in which only a subset of array element positions are used for transmission, while all are used for reception, are referred to herein as thinned transmitter arrays. The transmit/receiver subset is composed of elements uniformly spaced at an integer multiple of d, the receive array element spacing. An example of such a system is the N-element uniform receive array, with $d=\lambda_0/2$, coupled with the $(N+1)/2$ element transmit array with elements uniformly spaced at an interelement distance of $2d=\lambda_0$, for odd N. This kind of transmit array would be advantageous in that it would reduce element coupling effects on the transmit beam pattern as compared with the filled transmit array. There may also be an economic advantage simply in reducing the number of transmitters. In the set notation introduced above, the transmit array can be written as $B=\{0,2,4,\ldots,N-1\}$ while the receive array is represented by $A_{f,N}$. The sum coarray is represented by the set of all pairwise sums of elements from each of these two sets, and is equal to $C_{f,N}$. If a single image were to be formed with this system by beam forming and scanning, $(N+1)/2$ array element weights could be specified on transmit and N could be specified on receive, for a total of $(3N+1)/2$ degrees of freedom in all. Since there are $2N-1$ points in the sum coarray of this transmit/receive array pair, not every possible coarray weighting can be realized in such an image.

Figure 3A:
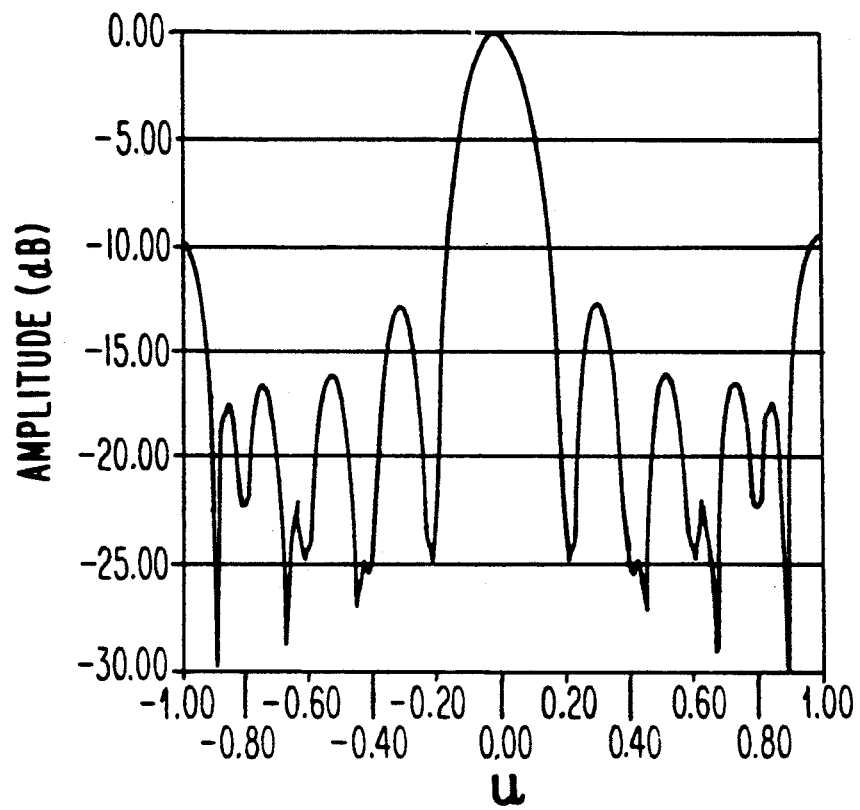
FIG. 3(a) illustrates the PSF amplitude of a linear array system using a 5-element sparse array ($2d=\lambda$ spacing) for transmit and a 9-element filled array ($d=\lambda/2$ spacing) for receive with unity element weights on both transmit and receive.
Figure 3B:
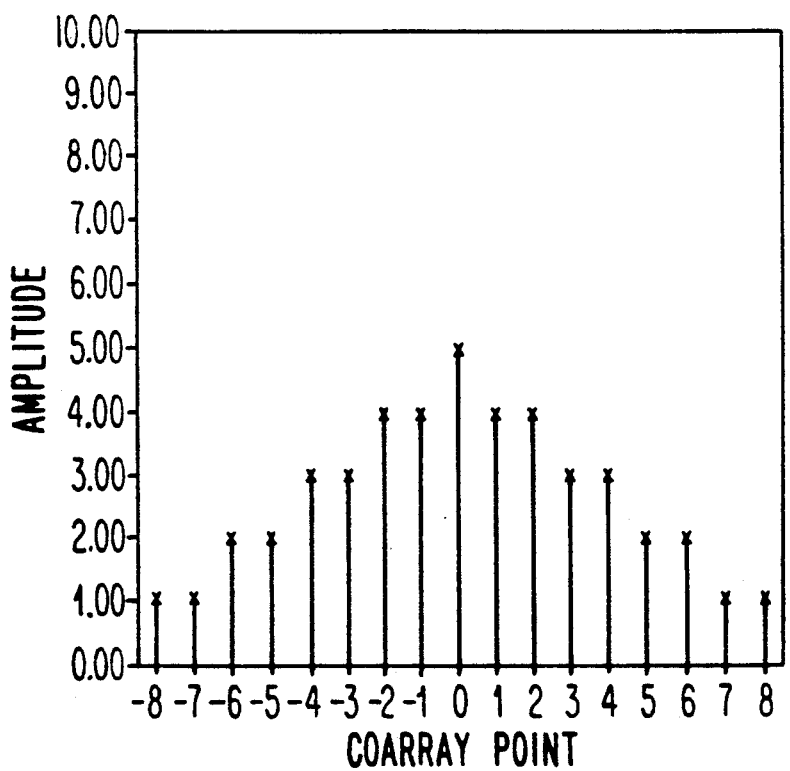
FIG. 3(b) illustrates the sum coarray weighting function associated with the image, of FIG. 3(a).

FIG. 3(a) shows the amplitude of the PSF of an image formed with this array system using unity weights on all elements for both transmit (N=5) and receive (N=9). FIG. 3(b) gives the sum coarray weighting associated with the image of FIG. 3(a). Since this array system is coarray equivalent to a filled, 9-element transmit/receive array, any desired PSF may be synthesized exactly as long as it is realizable with the filled transmit/receive array. However, as an illustration of the best (in some sense) result that can be achieved by way of beam forming and scanning without aperture synthesis, the desired Bartlett coarray weighting for a single component image will be approximated. That is, a single set of transmit/receive weights to give an approximation to the desired coarray weighting will now be designed, and the approximation will be carried out by numerical coarray matching as described above.

Figure 4A:
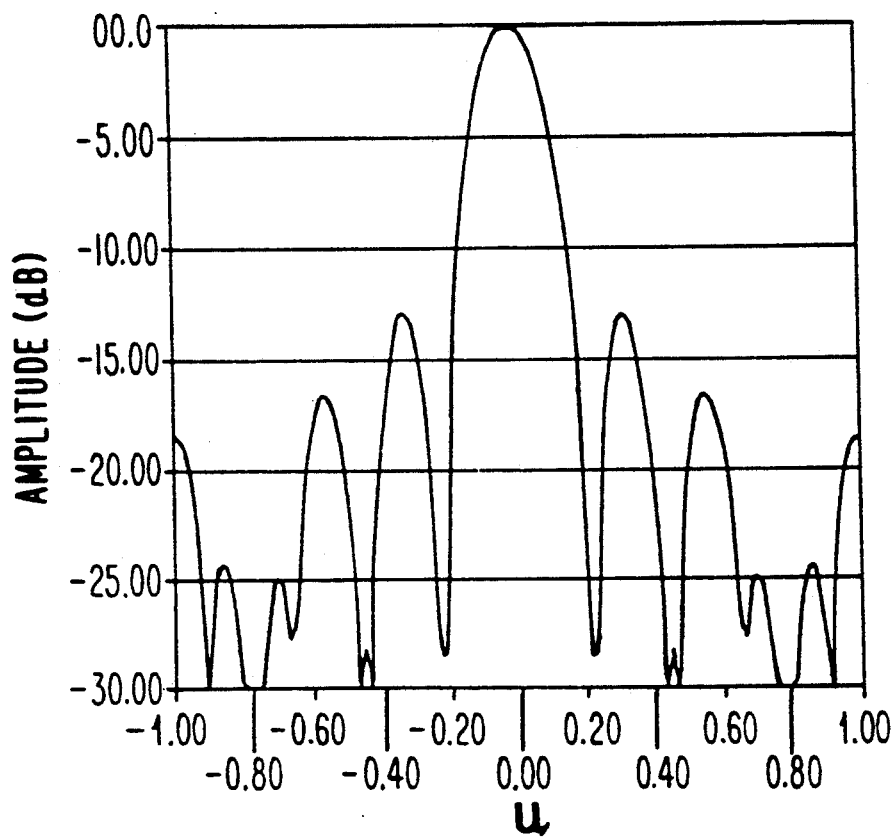
FIGS. 4(a) and 4(b) respectively illustrate the PSF amplitude of a single shot approximation to a sinc-squared PSF using a sparse transmit array ($2d=\lambda$ spacing) and a filled receive array ($d=\lambda/2$ spacing) and the associated coarray weighting.
Figure 4B:
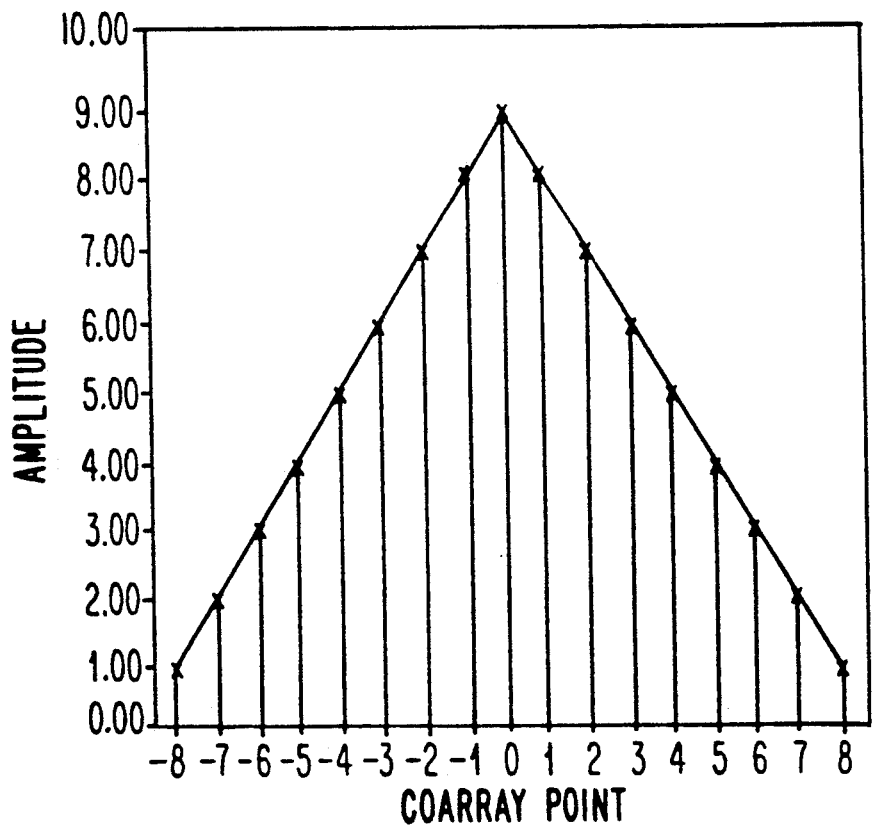
Figure 4C:
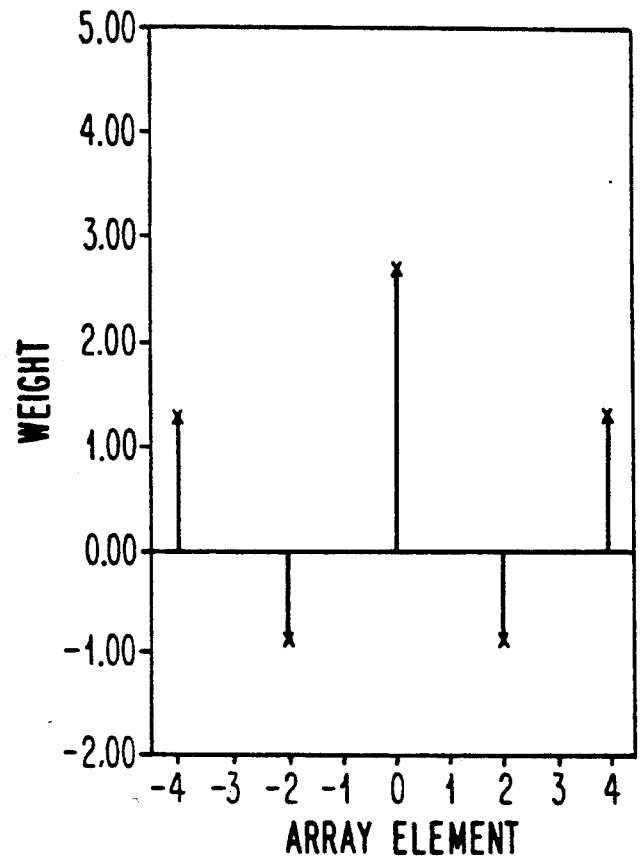
FIGS. 4(c) and 4(d) respectively illustrate the transmit and receive array weights for the single shot approximation of the sinc-squared PSF illustrated in FIGS. 4(a) and 4(b).
Figure 4D:
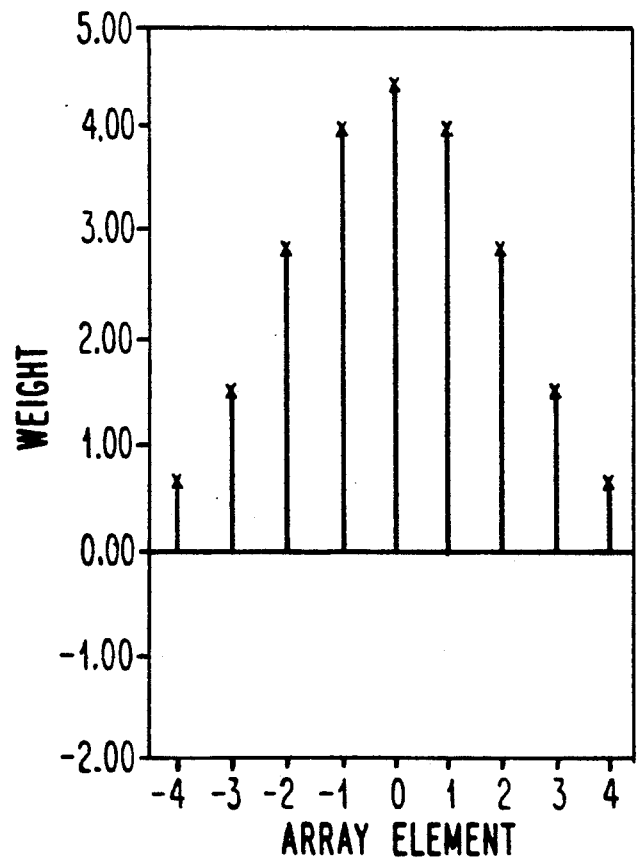

This approximate coarray weighting is depicted in FIG. 4(b) (with the envelope of the desired weighting superimposed to show the degree of error), and its associated PSF is shown in FIG. 4(a). FIGS. 4(c) and 4(d) show transmit and receive weightings designed to perform the single-component approximation of the coarray weighting. The main lobe and first side lobes of the desired PSF are quite well-approximated in this case for both the uniform array weighting and the single-component approximation. The single-component PSF approximation, however, achieves the same peak side lobe level as the desired PSF, while the uniform weighting PSF shows severe grating lobes due to the element spacing on transmit.

Figure 5A:
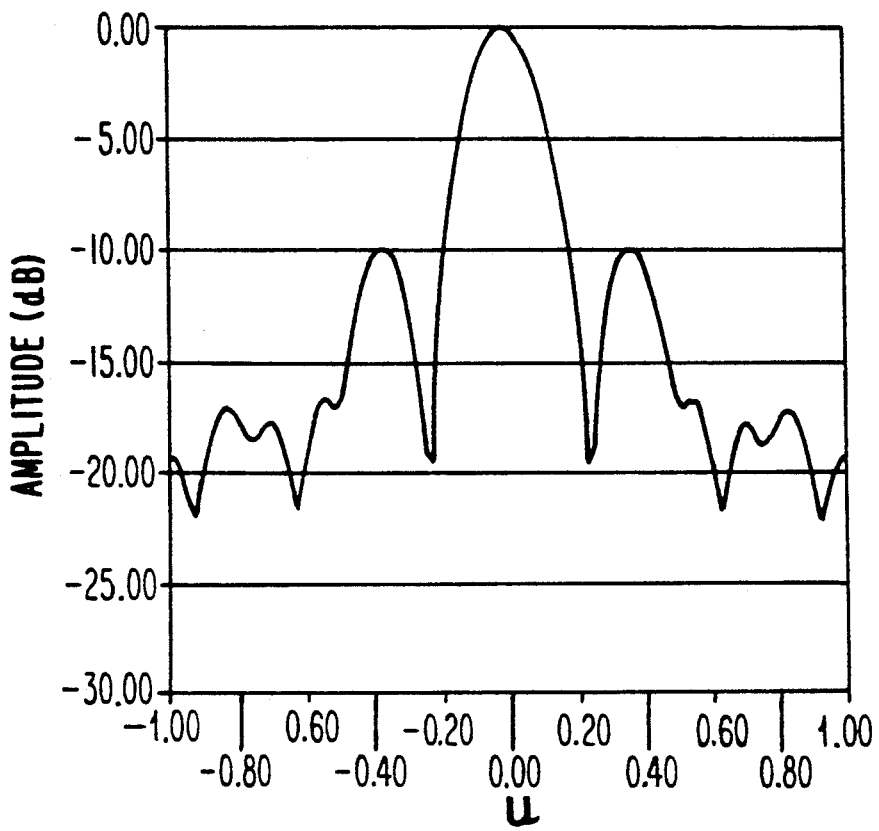
Figure 5B:
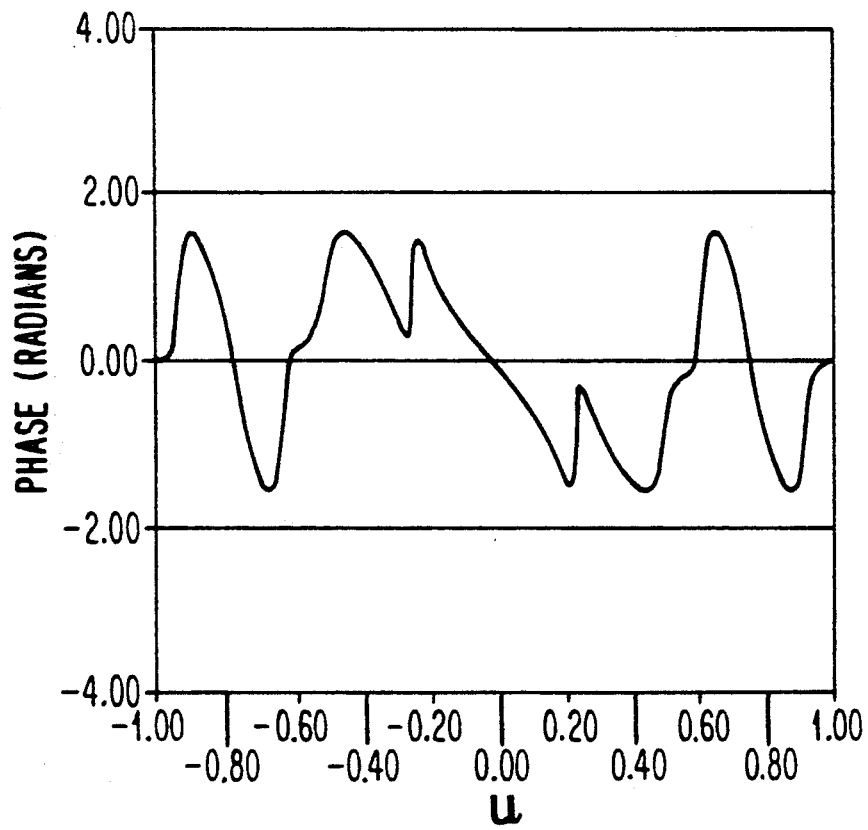
FIGS. 5(b) and 6(b) illustrate the phase of the respective components of a two component synthesis using a sparse 5-element transmit array and a filled 9-element receive array.
Figure 6A:
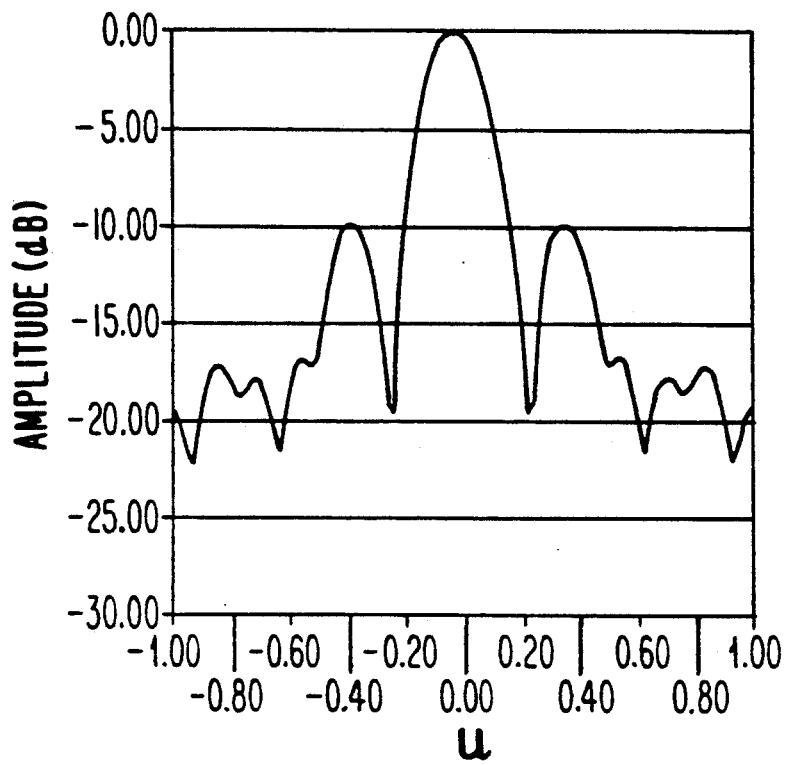
Figure 6B:
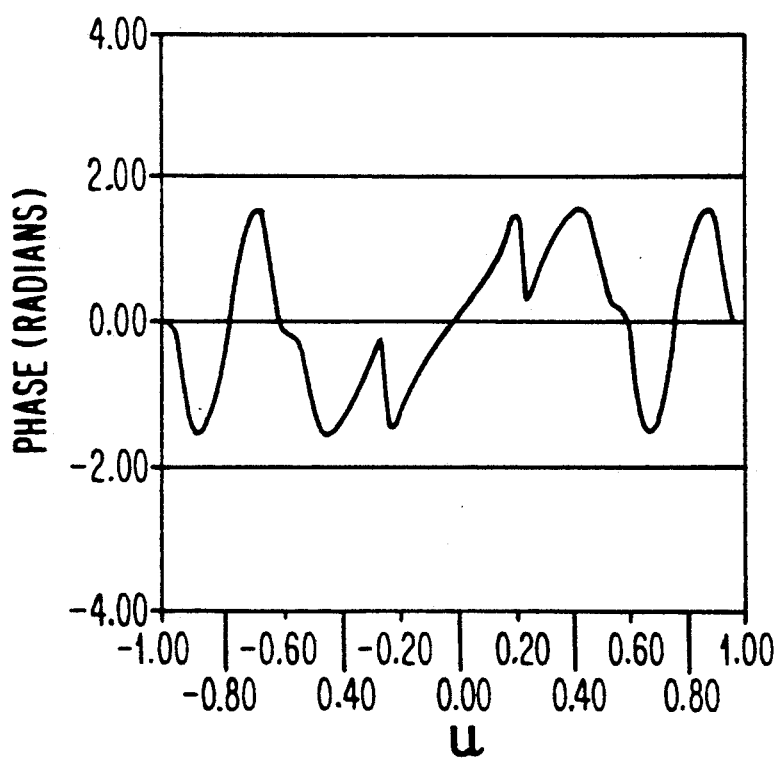

In the case of addition of two component images, the desired coarray weighting function can be achieved exactly, and the resulting PSF amplitude and coarray weighting function are exactly the same as the filled array functions of FIG. 2. The PSFs and coarrays of the two component images are depicted in FIGS. 5 and 6, where FIGS. 5(a) and 6(a) show the amplitudes of the PSFs and FIGS. 5(b) and 6(b) show the PSF phases. FIGS. 5(c) and 6(c) show the coarray weighting functions of the two images, while FIGS. 5(d), 5(e), 6(d) and 6(e) show their transmit and receive array element weights, respectively.

In FIGS. 5 and 6, the two component image PSFs are complex conjugates of one another. This is not a necessary characteristic of component PSFs for a two-component synthesis for this array system, but rather it is the result of an additional constraint wherein the same set of weights are applied on each of the two uses of the array but are in the reverse order to each other. Such a scheme minimizes the number of separate transmit and receive weights and may be advantageous in systems where processing channels may be multiplexed between elements. The addition of the two component images to form the desired sum image depends on their phase characteristics. The main lobes of the two component PSFs are both complex-valued and add to a real-valued sum. Because the components are completely in phase at $u=0$ and out of phase at other points, the main lobe of the sum PSF is slightly narrower than those of the components. The side lobes also add in a partially out-of-phase manner creating lower side lobe levels than those of the component images. In the synthesized PSF, the nulls closest to the main lobe are formed because the component PSFs both have nulls in those locations, while the next closest nulls depend on the completely out-of-phase addition of side lobe energy. On the other hand, FIGS. 5(c) and 6(c) show clearly how the component coarray weightings add together to form the desired compound coarray.

Figure 7A:
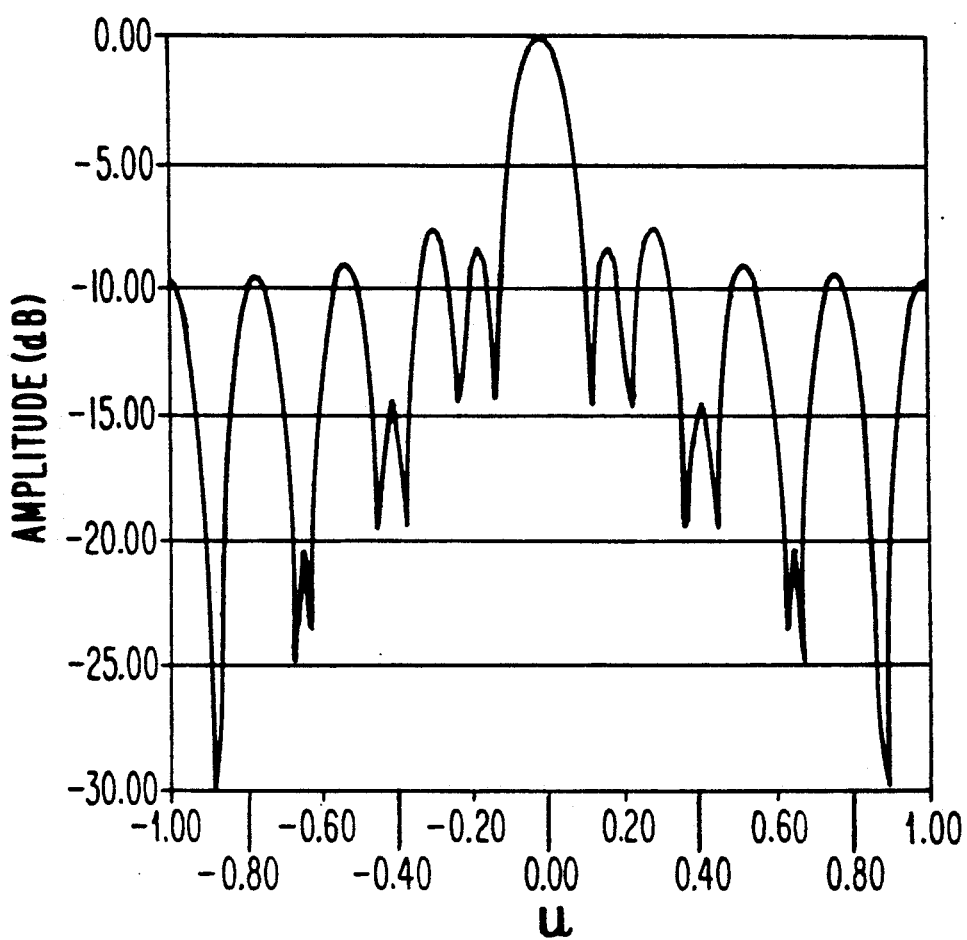
FIGS. 7(a) and 7(b) respectively illustrate the PSF amplitude and coarray weighting function obtained by using a 2-element transmit array ($8d=4\lambda$ spacing) and a 9-element receive array ($d=\lambda/2$ spacing) with unity element weights.
Figure 7B:
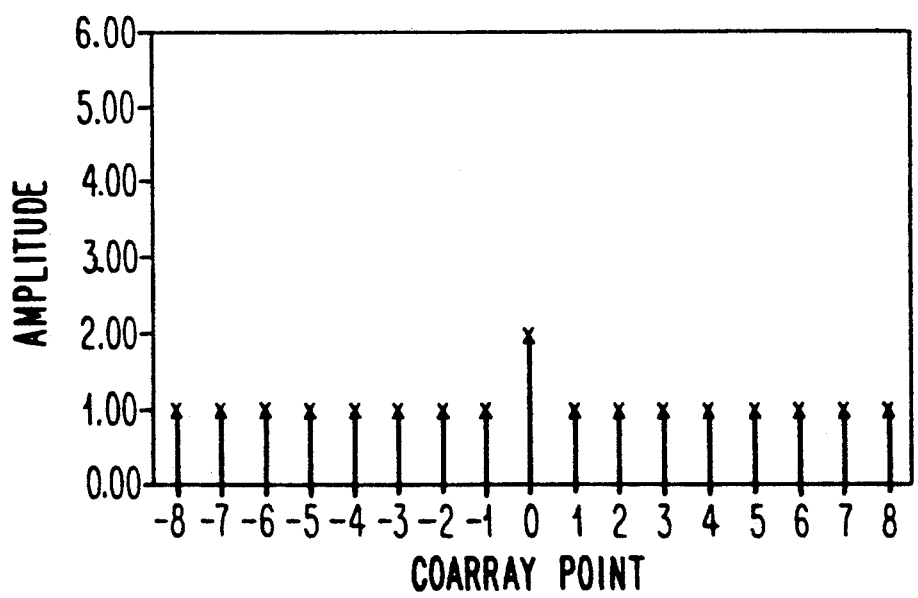
Figure 8A:
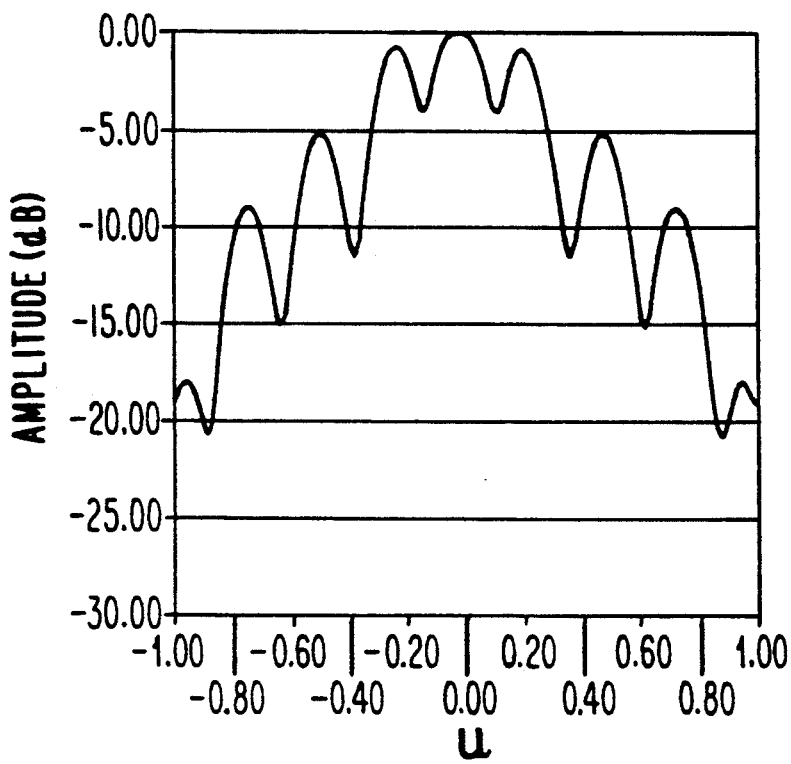
FIGS. 8(a) and 8(b) respectively illustrate the PSF amplitude and phase of the first component image of a 2-component synthesis using a sparse 2-element transmit array and a filled 9-element receive array.
Figure 8B:
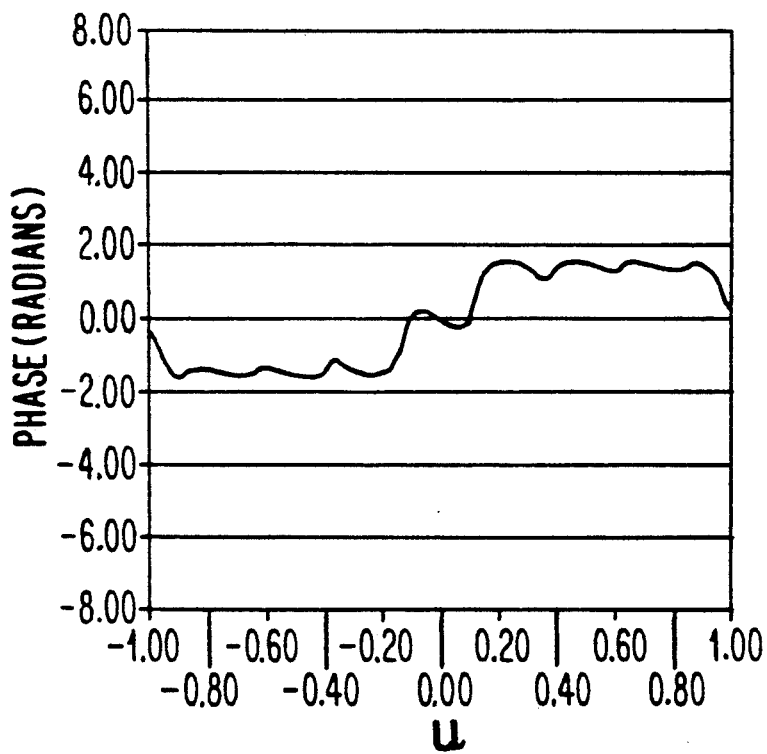
Figure 8C:
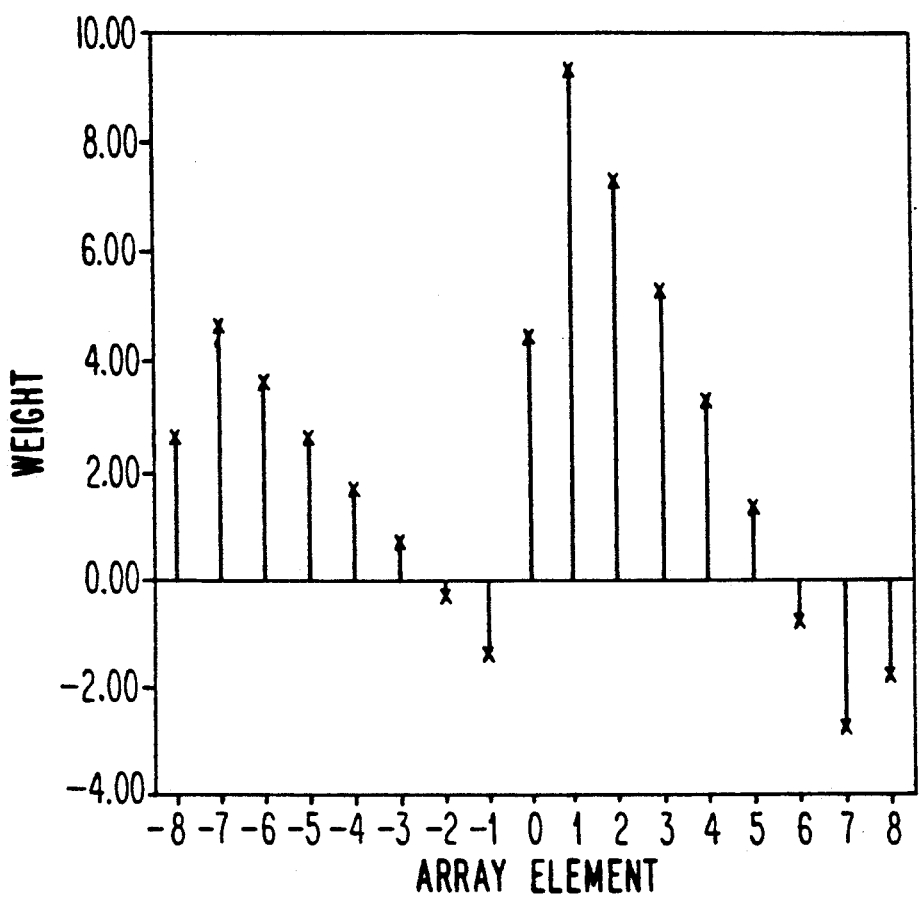
FIG. 8(c) illustrates the coarray weighting of the image of FIGS. 8(a) and 8(b).
Figure 8D:
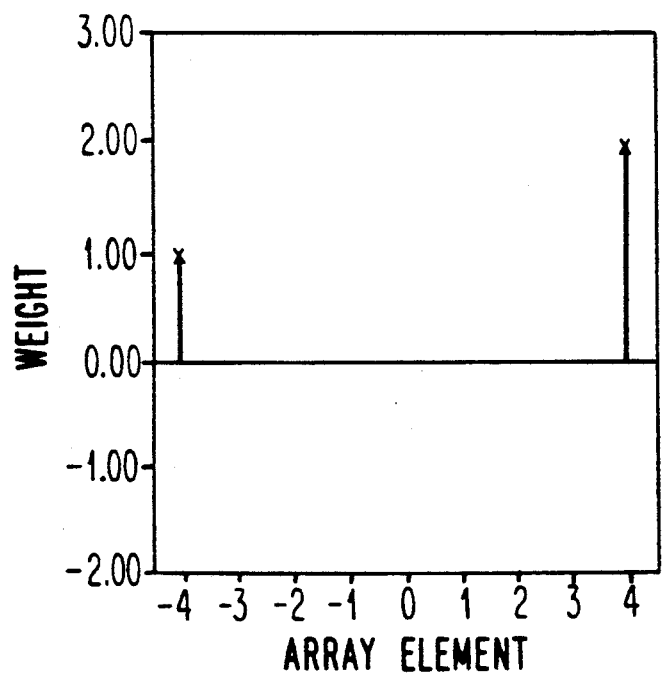
FIGS. 8(d) and 8(e) illustrate the transmit (FIG. 8(d)) and receive (FIG. 8(e)) array element weights of the image of FIGS. 8(a) and 8(b).
Figure 8E:
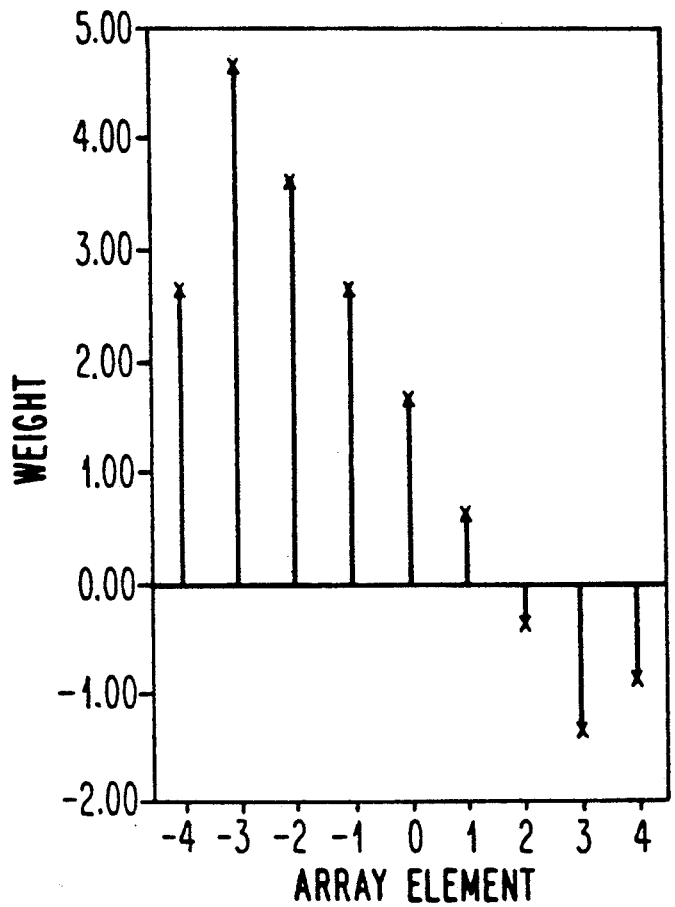

The $(N+1)/2$ element transmit array used above is not the only possibility for a thinned transmit array of length N. Consider a transmit array composed of elements deployed at $4d=2\lambda_0$ spacing. For example, the $N=9$ the transmit array may be represented by the set $\{0,4,8\}$. Using a filled, 9-element array with $d=\lambda_0/2$ element spacing for reception gives a sum coarray which is exactly $C_{f,g}$, the coarray of a filled transmit/receive array. In fact, using an interferometer on transmit with $8d=4\lambda_0$ 4-element spacing will also give a transmit/receive array system which is coarray equivalent to a filled array. FIGS. 7(a) and 7(b) depict the PSF amplitude and coarray weighting function of a system using a 2-element array with $4\lambda_0$ spacing for transmit and a 9-element filled array for receive with unity weights on all elements for both modes of operation. FIGS. 8(a) and 8(b) show the PSF amplitude and phase, respectively, of the first component image of a two-component image addition design. The second component image PSF was constrained to be the complex conjugate of the first. The coarray weightings, transmit element weights and receive element weights, respectively, of the first component image are depicted in FIGS. 8(c), 8(d) and 8(e). Again, the symmetry of this particular (and nonunique) solution comes from the fact that the array weights of the two shots are applied to the array in the reverse order from one another. The sum of the two coarrays is an exact match to the coarray weighting of FIG. 2(b) and so corresponds to a sinc-squared PSF.

When an interferometer is used on transmit, it is recommended that the transmit and receive arrays both be uniformly spaced, as above, and that the transmit and receive element spacings, $d_t$ and $d_r$ be related by either $d_t=N_r d_r$ or $d_r=N_t d_t$, where $N_r$ is the number of receive elements and $N_t$ is the number of transmit elements.

Clearly, the thinned transmit array systems discussed above are less redundant than the filled array of N transmit/receive elements for which $R_a=N^2/(2N-1)$. For example, the array system simulated in FIG. 3, which is composed of 9 receive elements spaced at d and 5 transmit elements spaced at 2d, has $R_a=2.65$. Of all the arrays considered above, the ones which make use of the interferometer for transmit are the least redundant. In fact, such an array of length N has $R_a=(N+1)/N$, and so is almost completely nonredundant. If the transmitters can be deployed independently of the receivers, $R_a=1.0$, which represents total nonredundancy. This reflects the fact that the effect of a longer filled array can always be synthesized from such an arrangement of transmitters and receivers by moving one of the transmitters outwards by a distance equal to one interelement spacing and keeping all receivers in the same places. This is true in general for thinned transmitter arrays. Thinned transmitter arrays should therefore be considered for use in modalities for which a transmit element may be used as a receive element at no extra cost, such as an ultrasound phased array.

None of the examples thus far presented represents a unique solution to the particular image synthesis problem to which it pertains. In general, an infinite number of possible sets of array weights exists when the number of degrees of freedom in choosing transmit/receive array weights exceeds the number of degrees of freedom of an arbitrary coarray weighting. For example, in the case of an interferometer used on transmit, one of the transmit weights can be taken to be zero on the first shot and the other can be taken to be zero on the second. If this weighting were used, each image would supply weights to a different half of the coarray, with the center coarray point being common to the two halves.

Uniformly Spaced Transmit/Receive Array With Missing Elements

Figure 9A:
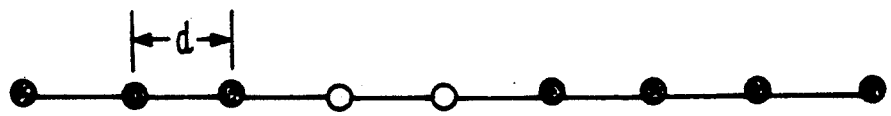
FIG. 9(a) illustrates a uniformly spaced ($d=\lambda/2$) transmit/receive array with two missing elements.

Another type of image synthesis system in accordance with the invention includes an N-element, uniformly spaced array of transmit/receive elements with M elements removed. It is assumed that the two end element positions are filled, but aside from that, any number and distribution of empty spaces is allowed. For example, FIG. 9(a) illustrates a uniformly spaced transmit/receive array with two adjacent missing elements. The black dots in the figure represent elements which are present, while the white dots represent possible element positions which are not occupied. Using the set representation introduced earlier, and letting $N=9$ and $M=2$, the array of FIG. 9(a) may be described as $\{0,1,2,5,6,7,8\}$. It may be easily verified that the set of all distinct sums of pairs of elements of $\{0,1,2,5,6,7,8\}$ is $C_{f,g}$, just as it was for the filled transmit/receive array. Since this array is coarray equivalent to the filled array, it is possible to synthesize with it an image having the sinc-squared PSF.

Figure 9B:
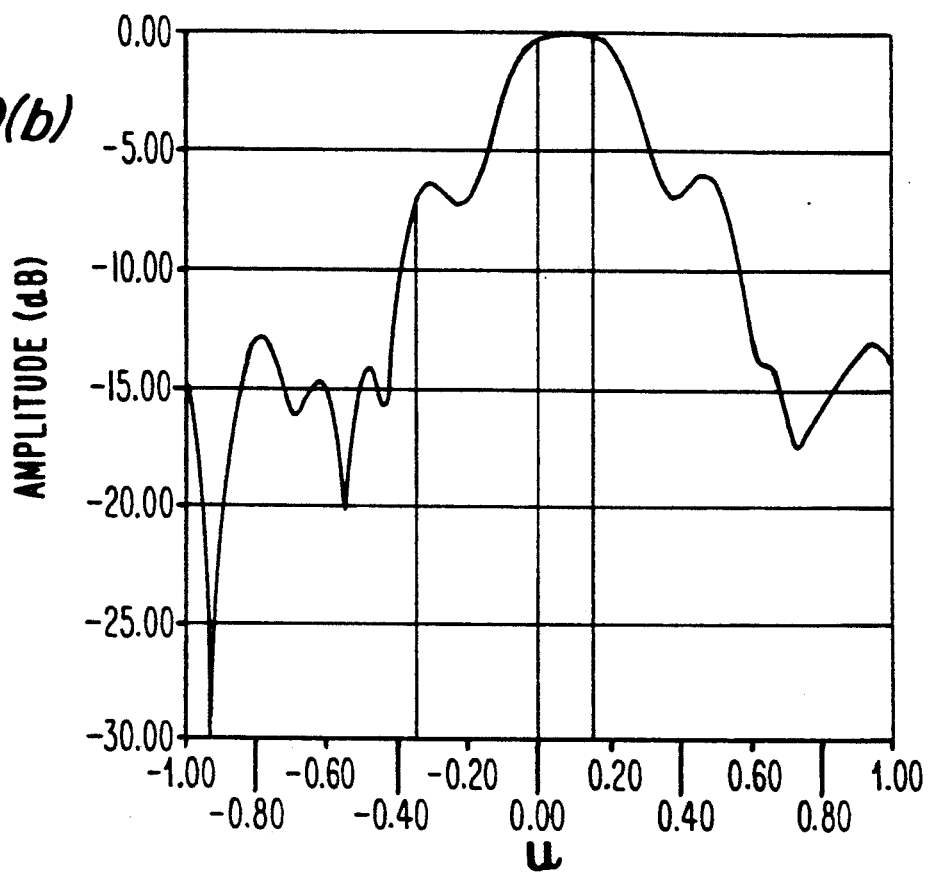
FIGS. 9(b) and 9(c) respectively illustrate a simulated image of three point reflectors formed using the array of FIG. 9(a) with uniform weights for transmit and receive and weighted to approximate a Bartlett coarray weighting.
Figure 9C:
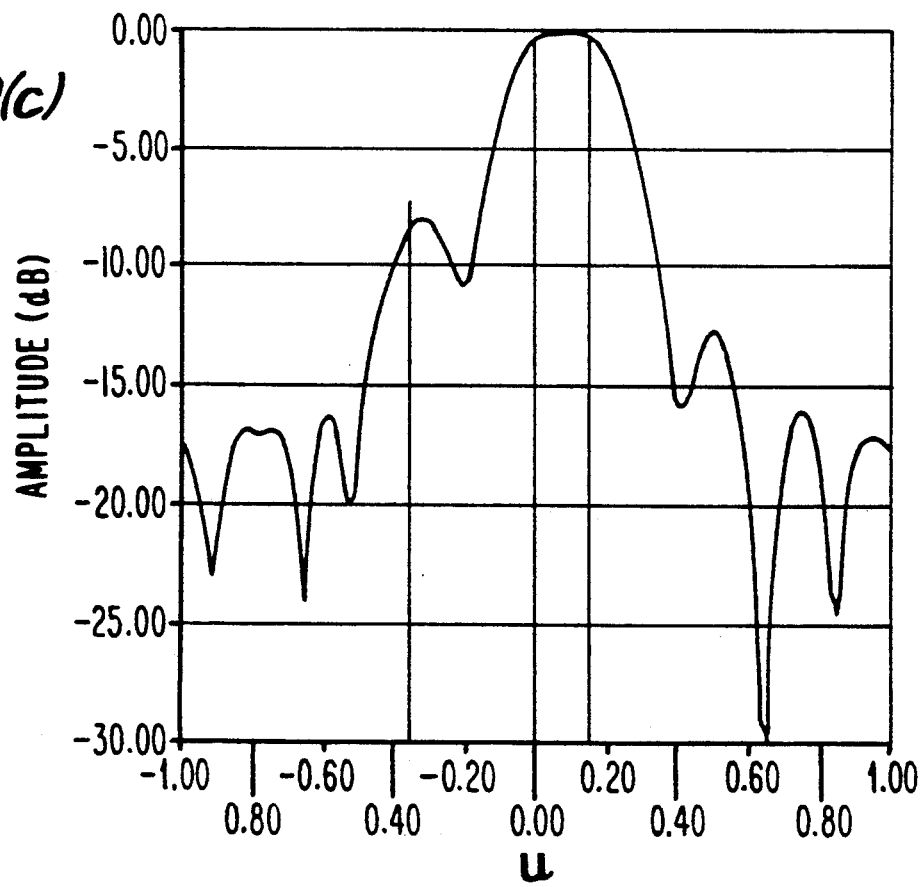
Figure 9D:
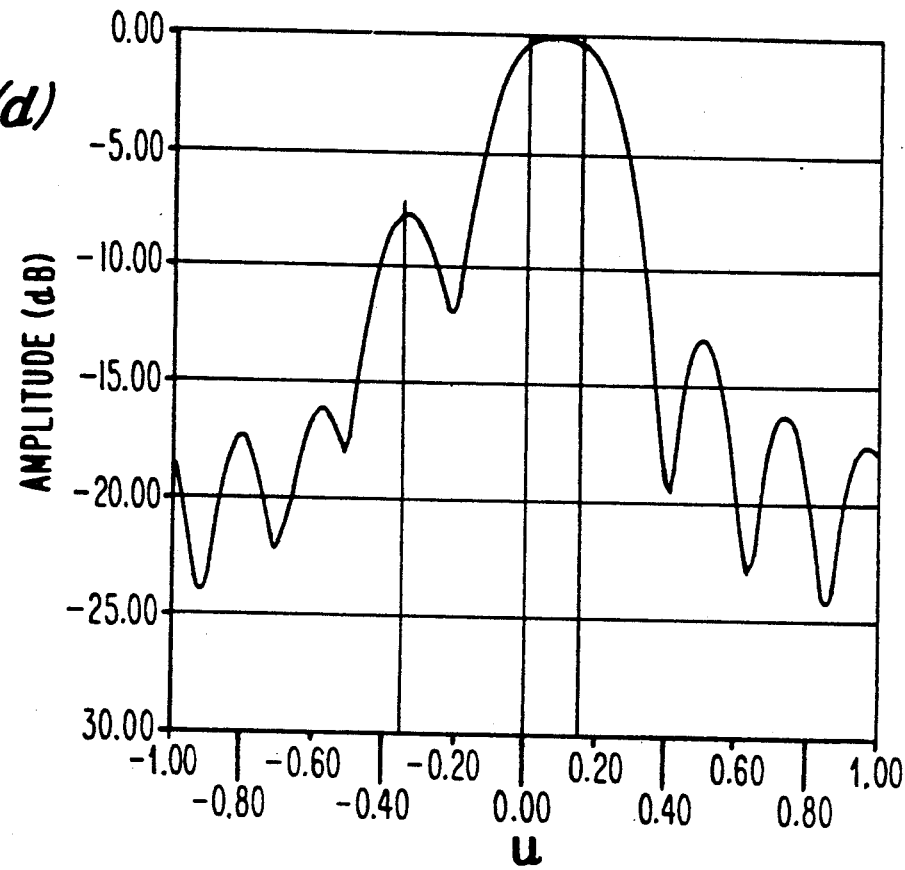
FIGS. 9(d) and 9(e) respectively illustrate a simulated image of three point reflectors formed using the array of FIG. 9(a) in a two-component synthesis of a Bartlett coarray weighting and a uniform coarray weighting.
Figure 9E:
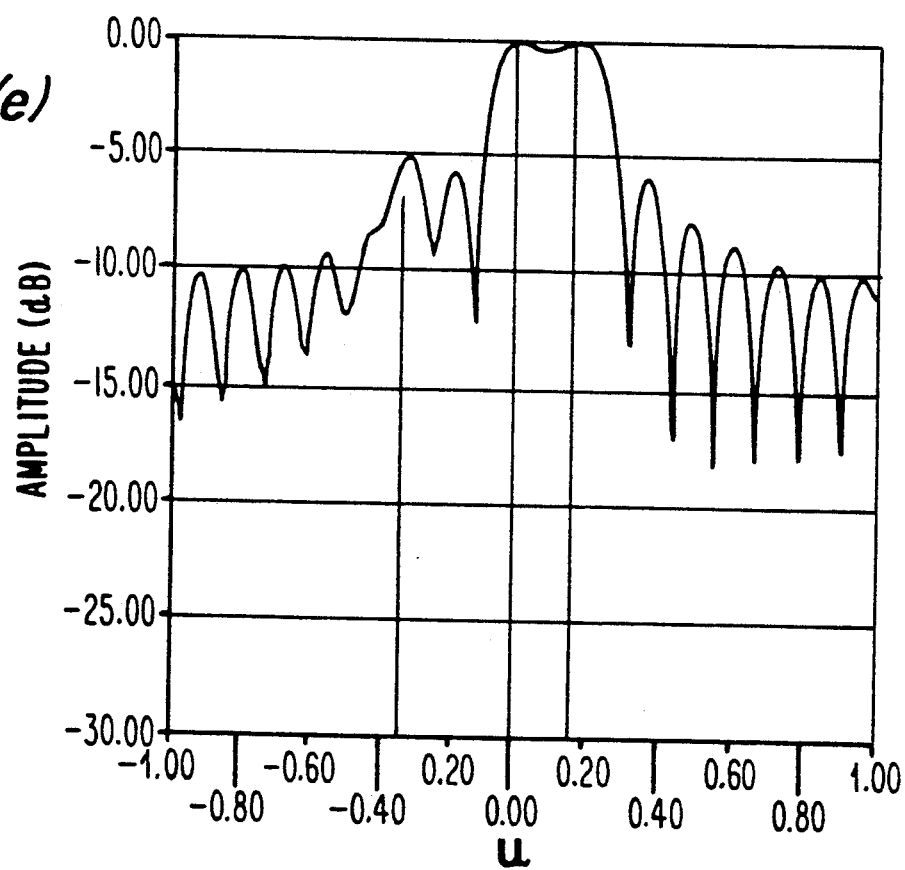

FIG. 9(b) illustrates the image of a simulated scene composed of three point reflectors, two closely spaced, of equal magnitude and zero phase, and one other of lesser magnitude in the side lobe region of the first two and of opposite phase from them. The locations of the reflectors are indicated on the figure by vertical lines whose heights represent the relative magnitudes of the target reflectivities in dBs. This image is produced by the array of FIG. 9(a) with uniform element weights on both transmission and reception. FIG. 9(c) illustrates an image showing the effect of a single-component approximation to the Bartlett coarray weighting using the array of FIG. 9(a), while FIG. 9(d) illustrates a two-shot approximation which provides an exact match to the Bartlett coarray. In both FIG. 9(c) and FIG. 9(d), the location of the lower magnitude target can be discerned; however, the two closely spaced targets are not distinct. FIG. 9(e) illustrates the simulated image associated with a two-component synthesis of a uniform weighting on the coarray. This coarray weighting (which is synthesized exactly here) provides the minimum integrated-squared-error between the realized PSF and an ideal, impulsive PSF, a fact which is known in the art in connection with the design of one-way beam patterns. In this image, unlike the others, the two closely spaced targets are resolved while, at the same time, the location of the other target is apparent.

The above scheme may be used in overcoming the effects of element failure in redundant active imaging arrays. This is a subject which has been treated recently for one-way array patterns by Sherrill et al. in an article entitled "In Situ Optimal Reshading of Arrays With Failed Elements," *IEEE Journal of Oceanic Engineering*, Vol OE-12, pp. 155-162 (Jan. 1987), and has also been considered by Greene et al. in an article entitled "Sparse Array Performance," *Journal of the Acoustical Soc. of Am.*, Vol. 63, pp. 1866-1872 (June 1978), for passive redundant arrays employing correlation beam forming. In the latter case, just as in the case of active imaging arrays, exact synthesis of the desired PSF is possible only if the element failures do not modify the coarray. If changes do occur in the coarray, then the best that can be done is to design a weighting on the new coarray which realizes a new PSF with some desirable characteristics. For example, the new PSF could be designed to have the same peak side lobe level as the original one. However, the present inventors have discovered that the problem of designing a new coarray weighting when the coarray has been modified by element failure is essentially the same as the problem of designing a new array weighting after element failure, and so methods such as those of Sherrill et al. could be considered.

Minimum Redundancy Arrays for Active Imaging

As noted above, a minimum redundancy array includes the smallest number of transmit/receive elements which can be deployed to achieve the effect of a filled linear array of transmit/receive elements of a given length. On the other hand, a minimum redundancy array can be used to determine the size of the largest filled linear array whose effect may be obtained by the use of a given number of elements.

Figure 10:
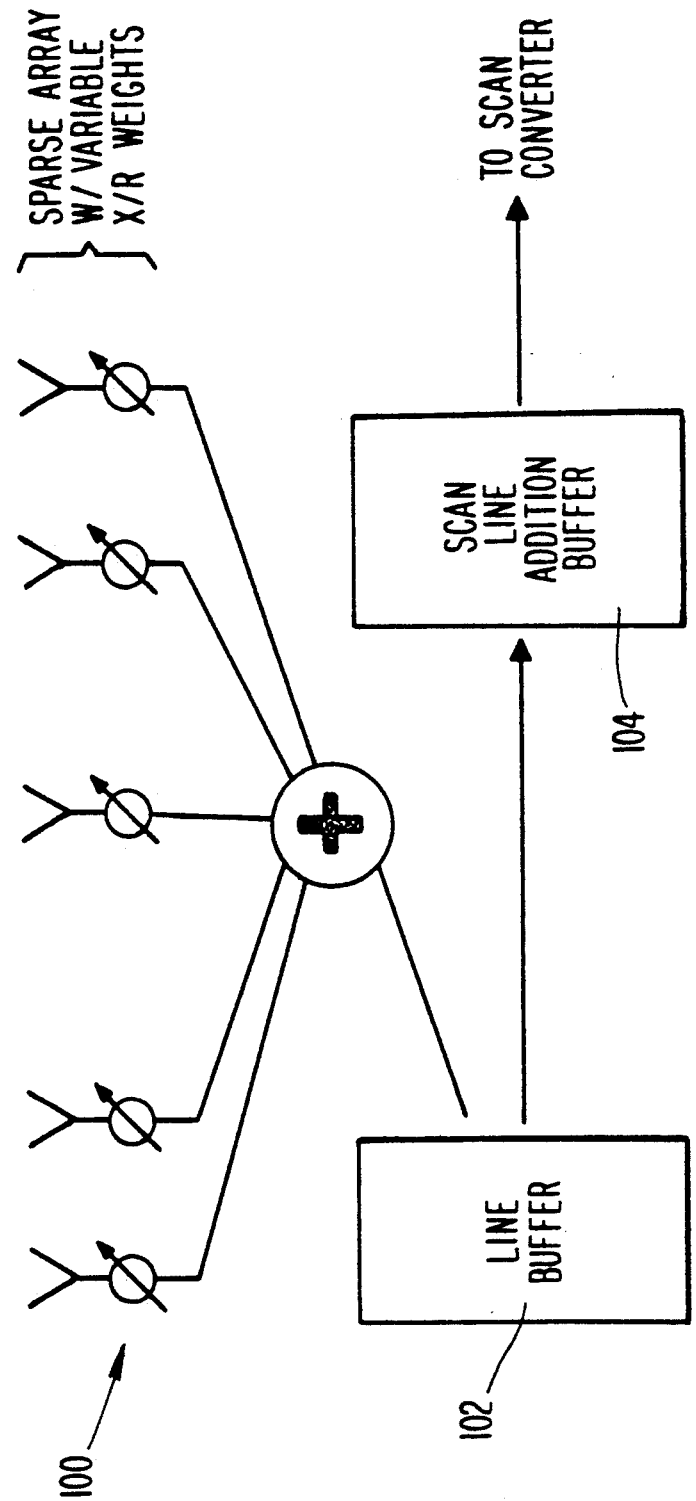
FIG. 10 illustrates an active minimum redundancy array in accordance with the invention for forming a single scan line at a time.

FIG. 10 illustrates a minimum redundancy array in accordance with the invention wherein a single scan line is formed at a time using a sparse array 100 with variable transmit/receive weights. Scan lines for a given look direction are stored in a line buffer 102 and added together in a complex (phase-sensitive) accumulation buffer 104, and the compound, synthesized scan lines are shipped to a scan converter just as though they were acquired in the normal manner from a filled array. The scan converter can thus deal with real-valued (demodulated) values.

When minimum redundancy arrays are used, the "phase center" of the arrays which form the component images are always the same. Thus, the phase (or time-of-flight) aberrations are the same for the component images and do not cause registration problems in image addition. Also, since image addition can be done on a line-by-line basis, prior to scan conversion, no multiplexing of the array need be done between component images, thereby reducing noise. In fact, no multiplexer is strictly necessary. When used, the function of the multiplexer in this system would be to switch from synthetic aperture mode to real aperture mode (that is, to switch between a wide, sparse array and a less wide, narrow array).

In the context of passive imaging of incoherent source distributions, it has been desired to find the maximum length filled array whose effect can be synthesized by the use of a given number of array elements. In fact, arrays which achieve a maximal length for a given number of elements while still retaining coarray equivalence with the filled array of the same length are also known as minimum redundancy arrays (MRAs) in passive imaging. The present inventors have extended this terminology to active imaging arrays composed of transmit/receive elements. As previously noted, in the case of passive imaging the coarray of interest is the difference coarray, while in the active case, the sum coarray is of interest. This implies that MRAs for active and passive imaging will be different for a given array. Producing examples of MRAs for a reasonably large number of elements is a difficult computational problem for reasons relating to the number of possible arrangements of a certain number of objects in a subset of a certain larger number of positions. However, although reduced redundancy arrays drawn from some restricted classes of passive imaging arrays are tabulated by Ishiguro in an article entitled "Minimum Redundancy Linear Arrays for a Large Number of antennas," *Radio Science*, Vol 5, pp. 1163-1170 (November 1980), Where these arrays are the longest arrays consisting of a given number of elements in their classes, reduced redundancy arrays for active imaging arrays have not been given similar treatment.

FIG. 11 gives a list of active minimum redundancy arrays (MRAs) for active imaging found by an exhaustive computer enumeration of reduced redundancy arrays with twelve elements or less. In FIG. 11, N stands for the number of actual transmit/receive elements in the minimum redundancy array, while L stands for the number of elements in the coarray-equivalent filled array. The redundancy $R_a$ of these arrays, found using Equation (8), is also illustrated, where $N_r N_t = N^2$, and the denominator of Equation (8) is $2L - 1$. These arrays are described using the convention of Moffet in an article entitled "Minimum Redundancy Linear Arrays," *IEEE Trans. Antennas and Prop.*, Vol. AP-16, pp. 172-175 (March 1968), whereby an array is represented by a set of dots separated by numbers giving the number of spacings between adjacent elements in units of the basic interelement spacing of the coarray-equivalent filled array. FIG. 11 illustrates, for example, that the effect of a 28-element linear phased array can be obtained by use of an array composed of only 12 elements. Exhaustive search for MRAs of more than twelve elements is time consuming, but by noting that every MRA in FIG. 11 has at least one symmetric variant, the search may be limited to symmetric active arrays.

FIG. 12 illustrates a list of thinned arrays which have minimum redundancy from among the class of symmetric active imaging arrays for number of array elements up to twenty (where the arrays are symmetric about the center element). As shown in FIG. 12, for typical ultrasound phased array systems with from 32 to 48 elements, only 14-17 elements need to be used. The price to be paid for this effect is an increase in the number of insonifications required per image with the associated decrease in frame rate. These arrays may be referred to as minimum redundancy symmetric arrays (MRSAs).

From FIGS. 11 and 12, it is clear that MRA redundancy increases with size, with some leveling off apparent for arrays with 7 or more elements. MRSA redundancy also seems to increase less dramatically with array size. Since the redundancy of the MRSAs provide upper bounds for the MRA redundancies, FIGS. 11 and 12 suggest that MRA redundancy approaches a fixed limit as array size increases and that this limit is close to $R_a = 3.0$. By contrast, the limit of passive array redundancy reported by Moffet is 1.33. When considered with the findings of Moffet, FIGS. 11 and 12 suggest that a passive array can be more heavily thinned than an active one.

It was noted above that even lower redundancies than those of FIGS. 11 and 12 can be achieved if some of the transmit/receive array elements are allowed to be receive-only elements. This brings into focus the distinction which must be made between the redundancy of an array and the cost of an array. In particular, even though thinned transmitter array systems can be made less redundant than the systems of FIGS. 11 and 12, they deploy a larger total number of elements. Therefore, one must choose between these schemes on the basis of the relative cost of transmit/receive and receive-only elements. If these two types of elements have approximately the same cost, then the MRAs and MRSAs of FIGS. 11 and 12 will be preferable to the thinned transmit array systems. In other words, the redundancy of an array is a measure of how poorly the deployment of the array elements makes use of the number and type of elements available. It is not a measure of cost, but of element utilization inefficiency.

From FIGS. 11 and 12 it also can be observed that certain patterns of element spacings occur over and over. Thus, although exact MRAs for large numbers of elements are not available, extension of one of the patterns found in FIGS. 11 and 12 to an appropriate number of elements will yield a low redundancy array which is coarray equivalent to a filled array of almost the same length as the MRA and is therefore an acceptable substitute for an MRA. For example, from FIG. 11 it can be learned that the array represented by the string ".1.1.3.3.1.1." is a minimum redundancy array for active imaging using 7 elements, which has the same length as and is coarray equivalent to a filled array of 11 elements. In set notation, this array may be written as {0,1,2,5,8,9, 10}. If the pattern of this array is extended to a 12 element array, a reduced redundancy array which may be represented by {0,1,2,5,8,11,14,17,20,23,24,25} (or .1.1.3.3.3.3.3.3.3.1.1.) is achieved. This array has a sum coarray which may be written as {0, ... ,50} and so is sum coarray equivalent to a filled array of 26 elements. From FIG. 11, the MRA having 12 elements is sum coarray equivalent to a filled array of 28 elements, and so the actual MRA has only slightly better resolution than does the reduced redundancy array (RRA) generated by extension of the pattern of a smaller MRA. The redundancy of the RRA generated by this method is $R_a = 2.82$, while for the 12 element MRA $R_a = 2.62$. By comparison, the redundancy of a 12-element filled array is $R_a = 6.26$. This idea can be used to generate low redundancy arrays for numbers of elements not covered in FIGS. 11 and 12.

Characteristics of MRA or RRA Synthetic Aperture Imaging System

An imaging system based on the principles described above could have two modes of operation, a fast frame rate, low resolution mode for exploratory imaging, and a slow frame rate, high resolution mode for detailed examination of objects of interest. For example, the fast frame rate mode of a typical system might yield the resolution of a 19-element filled linear phased array at 30 frames/sec, and such a system could also have a slow mode which produces the imaging effect (PSF) of a 65-element phased array at 10 frames/sec. As illustrated in FIG. 12, such a system would require only 19 transmit and receive channels in the pulsing and beam steering circuitry. Thus, the effect of a 65-element phased array can be achieved in accordance with the invention by a 19-channel phased array unit. Obviously, a 19-element phased array instrument can be built more cheaply than a 65-element unit and can also be constructed so as to occupy less space than the 65-element unit.

The array transducer of such a system would have the full length of the largest aperture to be used (in the example above, 65 elements), but not all of these elements need to be connected to the imaging circuitry since some will never be used by the instrument. For this mode of operation, a multiplexer must be provided which, in one control state, connects the imaging device to only the center 19 elements of the array. In the other state, the multiplexer would connect the 19 channels of the imaging device to 19 widely spaced elements on the 65 element array. In accordance with the invention, these elements will constitute a reduced redundancy array of the same length as a 65 element filled array.

Figure 16:
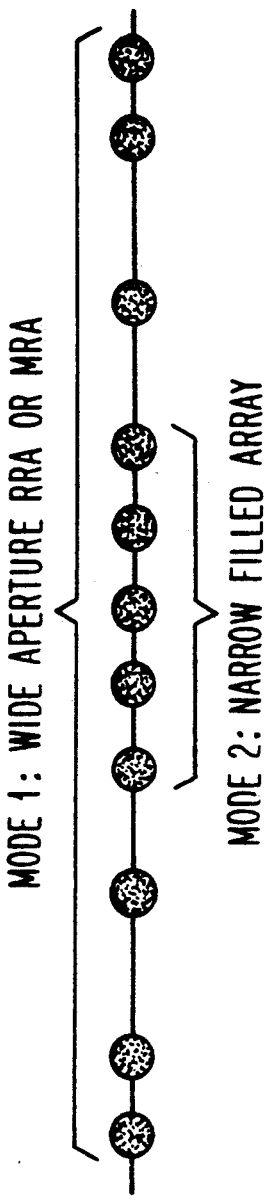
FIG. 16 illustrates a line array which can operate in either a wide aperture or narrow aperture mode without the requirement of a wide aperture array.

FIG. 16 illustrates the different apertures and arrays involved in such a dual-mode imaging system where a narrow aperture 5 element array is used in place of the above-mentioned 19 element array. As illustrated, the array selected in mode 1 is an RRA/MRA and requires aperture synthesis (image addition) to achieve the PSF of a filled array of the same aperture. On the other hand, the array selected in mode 2 is a filled array corresponding to a smaller aperture which does not require aperture synthesis.

Design and Operation of MRA or RRA Imaging System

A synthetic aperture imaging system using an RRA or an MRA has been designed by the present inventors for implementing the dual-mode operation described above. This system's transducers are multiplexed or switched between the circuitry described below (FIG. 13) and the circuitry of a standard phased array ultrasound system with the same number of channels.

In simplest terms, the system of the invention may be described as operating by adding A-lines together to form synthetic A-lines, which may then be scan-converted to form the desired image A-lines (or A-scans) are simply one-dimensional images of the scene formed along a given look direction from the aperture or array. The A-lines are formed by directing ultrasound from the array in a certain direction toward the scene to be imaged and sampling the echo at certain times corresponding to certain ranges or distances from the array. The samples must be recorded in a way which preserves their phase. For example, they may be saved as complex numbers using In-phase/Quadrature representation. Successive A-lines of complex data are added together on a sample-by-sample basis; that is, the $n^{th}$ sample of each is added together with the $n^{th}$ samples from all of the other A-lines associated with a given look direction. The number of A-lines to be taken is to be determined beforehand by the designer of the system. Then, after the A-lines are added, the modulus is taken of each sum of samples, and the real-valued A-line which results is ready to be assembled into an $r-\theta$ image prior to scan conversion.

Figure 13:
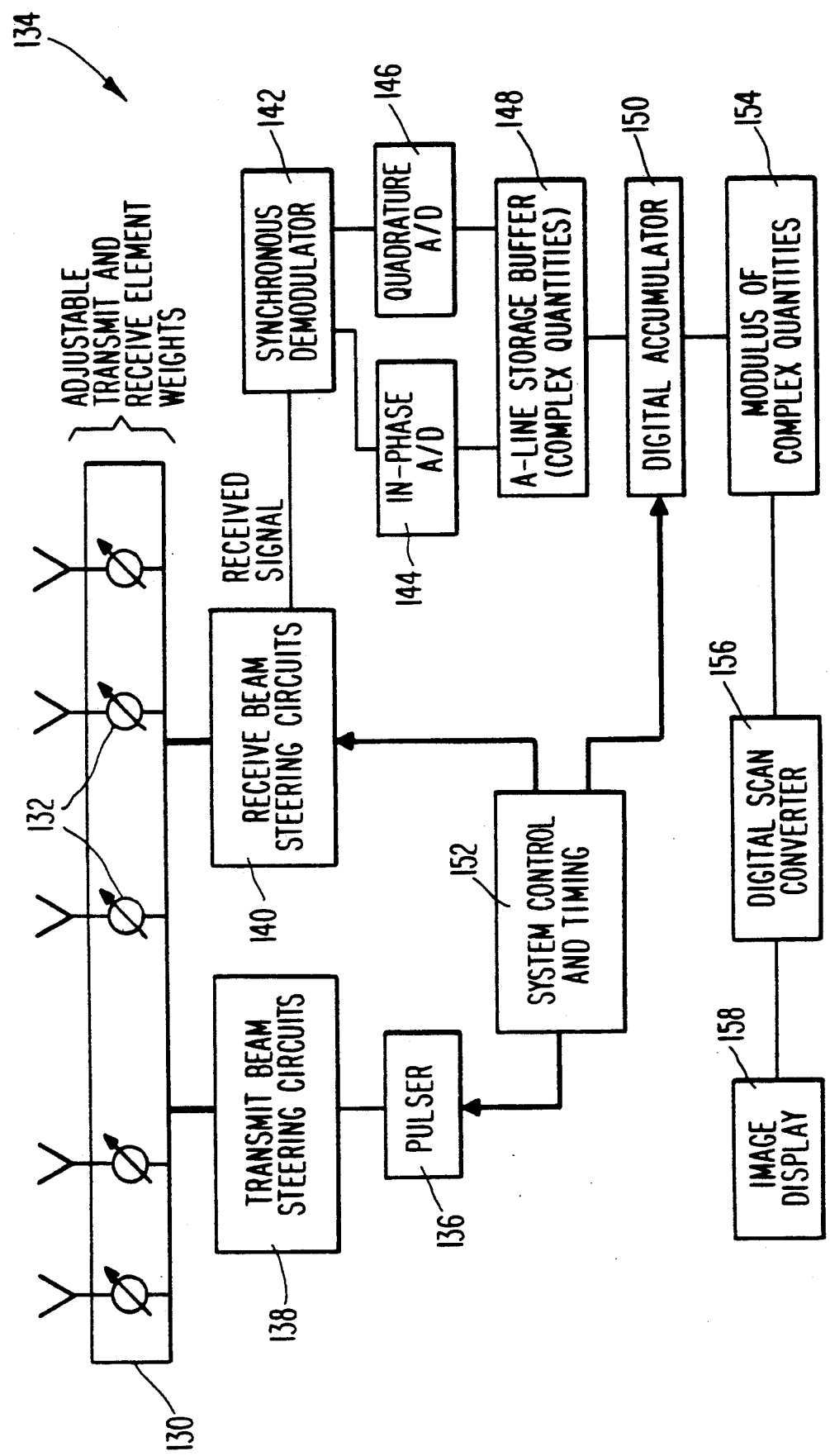
FIG. 13 illustrates a preferred embodiment of an ultrasonic imaging system in accordance with the invention.

FIG. 13 depicts a preferred embodiment of an ultrasonic imaging system in accordance with the invention. As shown, it consists of an array 130 of high frequency acoustic transducers 132 and supporting electronics 134. The acoustical transducers 132 convert electrical signals to high-frequency sound and also convert high-frequency sound to electrical signals. The array geometry is that of a thinned, minimum (or reduced) redundancy array as herein defined. The array elements are excited by the Pulser 136 by way of the transmit beam steering circuitry 138, which imposes elementwise transmit delays to form a transmit beam in the standard way. In addition to the delays imposed by the transmit beam steering circuitry 138, amplitude weightings are imposed on the transmissions from the individual array elements as will be described below. That is, that transmissions are made with a fixed set of amplitudes, which differ from element to element. When the echoed ultrasound arrives back at the array 130, the receive beam steering circuits 140 delay the signals from each array element to form a receive beam in the standard manner. In addition to the delays imposed by the receive beam steering circuitry 140, amplitude weightings are also imposed as also will be described below.

The received signal (which is the phased sum of the signal received at each of the array elements) is synchronously demodulated into In-phase and Quadrature components by synchronous demodulator 142. These components are then digitized by A/D converters 144 and 146 and stored in an "A-line" buffer 148, which is a digital storage buffer which stores the complex return for each sampled range in a given look direction. The A-line storage buffer 148 is connected by one or more digital data paths to an "A-line" accumulator 150. This is a device composed of a complex digital accumulator for each sampled range. With accumulator 150, successive complex A-lines may be added together. The digital accumulator 150 also may be cleared (reset to contain all zeros) by the system control unit 152. Each sample of the accumulated A-line is then converted from a complex value into a real value by the process of computing the modulus of each complex number at 154. The result of this operation is a real-valued A-line, just as may be obtained from any standard B-scan imaging device. This data is then presented to a digital scan converter 156 and then to the display output device 158 for display, just as in any standard B-scan imaging system.

Figure 14:
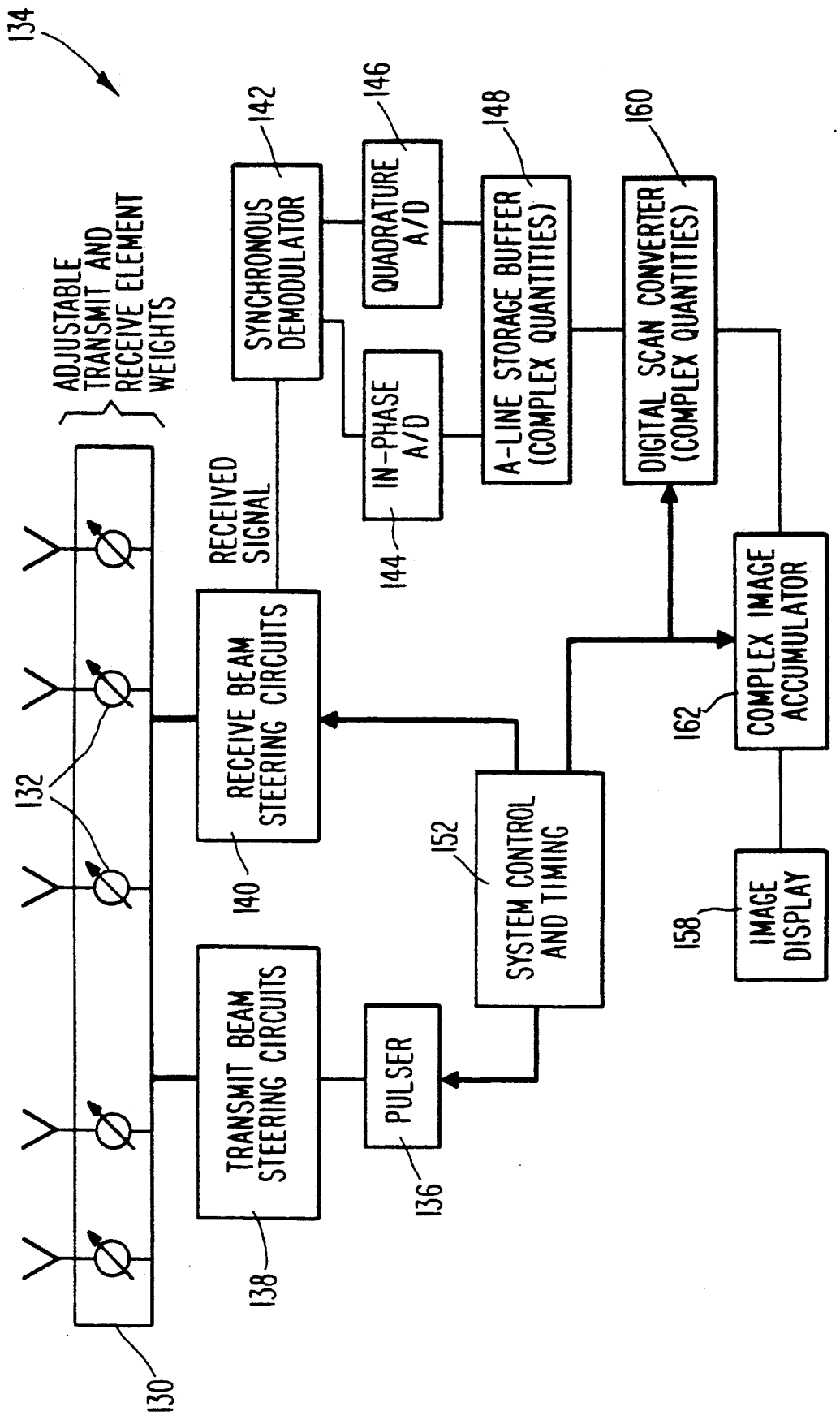
FIG. 14 illustrates a system diagram of an RRA/MRA aperture synthesis system using complex image addition rather than line accumulation.

Other design options for MRA or RRA aperture synthesis systems in accordance with the invention are also possible. For example, as illustrated in FIG. 14, instead of adding A-lines together, the system could be structured to scan convert using complex scan converter 160 all of the A-lines obtained with a given transmit/receive array weighting to a rectangular format, retaining phase information (which is contained in the in-phase/quadrature representation). The resultant complex images could then be added together on a point-by-point basis in a complex image accumulator 162, the modulus of each pixel of the complex sum image taken, and the resultant real-valued image displayed by image display device 158 as the final result. However, the design of FIG. 13 is presently preferred on the basis of simplicity.

In addition, the A-lines can be obtained in any order of look direction and array weighting. The particular order described above is designed to maximize the coherence of the scene to be imaged among the A-lines which are actually to be added together. Also, planar, 2-dimensional arrays can be used instead of linear, 1-dimensional arrays. Furthermore, the amplitude weights can be imposed on receive by a digital device. Of course, other modifications may also occur to those skilled in the art.

Design of MRAs: Specification of Element Deployment

As noted above, given a uniformly-spaced, filled linear array of certain dimensions, a sparse array of the same dimensions can be created by removing some subset of the array elements. In order to preserve the length of the array, the endmost elements may not be removed. A planar sparse array can be created in the same way from a filled, uniformly spaced planar array, but not all of the elements on any of the exterior boundaries of the array may be removed. As noted above, any such array which is coarray equivalent to the filled array from which it was generated is a reduced redundancy array.

Any sparse array so formed may be checked in the following way to see if it retains coarray equivalence to the original filled array of the same dimensions and thus retains the capacity for forming the same class of images as the filled array:

Step 1: Form a sequence of integers, assign a one for each of the N elements of the original filled array.

Step 2: For each element of the filled array which is retained in the thinned array, set the corresponding value in the sequence to unity. For each element of the filled array which is removed from the original filled array to form the sparse array, set the corresponding value in the sequence to zero.

Step 3: Form the self convolution of the resulting sequence of ones and zeros; that is, form the sequence whose $i^{th}$ element is:

$$S_o(i) = \sum_{K=1}^{N} S_f(k)S_f(i-k), \qquad \text{Equation (9)}$$

where $\{S_f(k)$, for $k=1,\ldots,N\}$ is the sequence formed above, with the understanding that $S_f(k)=0$ if $k<1$ or $k>N$.

Step 4: If any element of the sequence $\{S_o(k)$, for $k=1,\ldots,2N-1)$ is equal to zero, then the sparse array represented by the sequence $S_f$ is not a minimum or reduced redundancy array, for it fails to be coarray equivalent to the original filled array.

In order to generate a list of all reduced redundancy arrays of a given length and number of array elements, one way would be to generate each sparse array of that length and number of elements and test each one as above. FIGS. 11 and 12 give a list of minimum redundancy arrays having an actual number of elements given by N. For a fixed length of array, as the number of elements decreases so does the number of reduced redundancy arrays. Below a certain number of actual elements (again for a fixed length), no reduced redundancy arrays exist. All reduced redundancy arrays having that number of elements are also minimum redundancy arrays.

Design of Transmit and Receive Weights for Component A-lines or Images

The individual images to be used in the aperture synthesis procedure described above may be found in the manner now to be described. As indicated above, the characteristics of these images are controlled by specification of the array element amplitude weights used on transmission and reception. Given the particular array (presumably an RRA or MRA found by the procedure given above) and given a desired number of A-lines or images to be added together (specified by the system designer, probably on the basis of a desired or allowable frame rate in image presentation), the design of the array weights may be formulated as a minimization problem. Algorithms for the solution of such problems are plentiful and well-known. For example, the method of steepest descent may be used.

The objective function to be minimized is the scalar, real-valued function of the array transmit and receive weights. It is given by the summation of the squared differences between the desired image coarray weighting function values and the image coarray weighting function values determined by the array weights. Since the image coarray weighting function is the inverse transform of the point spread function, it therefore determines the characteristics of the image. Now, if a sparse array formed by removing elements from a filled array of N elements is used to form L images which are then added together as described above, the coarray weighting function of the composite image may be written as:

$$W_s(i) = \sum_{n=1}^{L} \sum_{k=1}^{N} W_{t,n}(k) W_{r,n}(i - k),$$ Equation (10)

where $W_{t,n}(k)$ is the transmit amplitude weight on the $k^{th}$ element used for the formation of the $n^{th}$ A-line or image, $W_{r,n}(k)$ is the receive amplitude weight on the $k^{th}$ element used for the formation of the $n^{th}$ A-line or image and $W_s(i)$ is the synthesized weight at the $i^{th}$ coarray point. All missing elements are constrained to have weight zero, and $W_{t,n}(k)=0$, if $k<1$ or $k>N$ and $W_{r,n}(k)=0$, if $k<1$ or $k>N$, for all n.

If it is desired to synthesize an image with a PSF which is the Fourier transform of the desired coarray weighting $W_d(i)$, as for a triangular coarray weighting associated with using a uniformly weighted, filled, uniformly spaced array for both transmit and receive, as in a standard ultrasonic imaging system, then the function to be minimized would be given by:

$$J = \sum_{i=1}^{M} |W_d(i) - W_s(i)|^2,$$ Equation (11)

where M is the number of points in the coarray. J is a function of all of the transmit and receive element weights, and the minimum value of $J=0$ is achieved for any set of array element weights which exactly implements the desired synthesis. For some values of L (the number of component A-lines or images), an exact solution ($J=0$) may not be possible. In such cases minimization of J yields an approximate solution. Constraints on the weight values also may be added as dictated by the necessities of the hardware design. Thus, while the above problem is given as an unconstrained minimization, those skilled in the art will appreciate that constraints may be included to reflect any desired condition on the element weights.

Thus, various examples of image synthesis using reduced redundancy, thinned arrays on transmit and/or receive are possible in accordance with the invention. The advantage of such an imaging system is that it reduces the number of elements necessary to achieve a given main lobe resolution or maximizes the resolution of an imaging system making use of a given number of elements. The cost of reducing the number of elements in an imaging array is the loss of a certain number of degrees of freedom in applying a weighting to the coarray. However, these degrees of freedom may be regained by forming the sum of a number of component images, each formed with different transmit/receive weights. The number of component images required will be determined by the number of degrees of freedom required to impart the desired coarray weighting.

Figure 15:
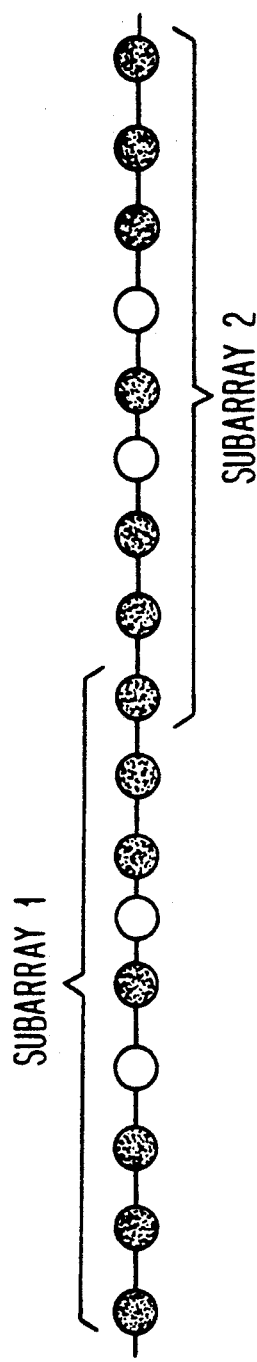
FIG. 15 illustrates a line array comprising two thinned subarrays with one overlapping element.

As described in the aforementioned article by the present inventors, another way of making use of a large linear array with only a limited number of processing channels is to partition the array into overlapped subarrays. While this scheme has been suggested in U.S. Pat. No. 4,553,437 to Luthra et al. for the case of adjacent subarrays with 50% overlap, significantly less overlap is required. In fact, the present inventors have shown that the overlap need only be by a single element as illustrated in FIG. 15 for overlapping thinned arrays in accordance with the invention. This scheme offers the same advantages as the reduced redundancy scheme of the present invention whereby the effect of a large, filled array is achieved with only a small number of processing channels. Those skilled in the art will appreciate that RRAs and MRAs could be used in conjunction with overlapping subarrays by connecting processing channels to the physical array by way of a multiplexer, which would be used to select the subarray to be used for imaging. Each subarray could be an RRA or MRA as herein described; however, the image addition would have to be modified.

Although several embodiments of the invention have been described in detail above, those skilled in the art will appreciate that numerous other modifications to the invention are possible within the scope of the invention. For example, the techniques of the invention may be used to provide a small, perhaps portable, phased array unit consisting of 16 processing channels. The probes would be 32- and 48-element linear arrays. The instrument would operate at two (or more) frame rates: a full-speed, 30 frames/second mode using the center 16 elements of the phased array transducer as an imaging aperture and a slower, high-resolution mode in which a longer, sparse array subset of elements is employed for aperture synthesis. Also, aperture synthesis in accordance with the invention may be applied to Doppler weather radar systems of the type disclosed by Zrnic et al. in an article entitled "A Switched Pattern Radar Antenna Array," *IEEE Trans. on Antennas and Prop.,* Vol. AP-35, pp. 1104–1110 (October 1987), using a thinned array rather than a filled one. Moreover, those skilled in the art will appreciate that the techniques of the invention may be readily applied to planar array imaging systems of differing shapes and sizes by determining and then synthesizing the PSF of the planar array in accordance with the techniques herein described. Accordingly, the scope of the invention is not intended to be limited to the preferred embodiments described above, but only by the appended claims.

We claim:

1. A synthetic aperture ultrasound imaging system for imaging a target with a resolution limited by a designated aperture, comprising:
    a phased array of nonuniformly spaced ultrasound transducers having an average inter-transducer spacing which is greater than a $\lambda/2$ Nyquist spacing for said transducers;
    means for applying amplitude weightings to each of said nonuniformly spaced ultrasound transducers during transmit and receive modes to form a number of component images; and
    means for adding said component images on a point by point basis to form a sum image which has a point spread function which more closely approximates a desired point spread function which is unattainable by a single image taken by said nonuniformly spaced ultrasound transducers.

2. A synthetic aperture ultrasound imaging system for imaging a target with a resolution limited by a designated aperture, comprising:
    a phased array of nonuniformly spaced ultrasound transducers having an average inter-transducer spacing which is greater than a $\lambda/2$ Nyquist spacing for said transducers, said phased array of nonuniformly spaced ultrasound transducers providing coarray equivalence to a phased array of transducers which are substantially uniformly spaced at said $\lambda/2$ Nyquist spacing to provide said designated aperture for forming a single image having a desired point spread function;
    means for applying amplitude weightings to each of said nonuniformly spaced ultrasound transducers during transmit and receive modes to form a number of component images; and
    means for adding said component images on a point by point basis to form a sum image, a point spread function of said sum image being substantially equivalent to the desired point spread function of said single image formed by said substantially uniformly spaced transducers with said designated aperture.

3. The ultrasonic imaging system of claim 2, wherein said weightings applying means comprises a transmit beam steering circuit which imposes transmit delays between respective ones of said nonuniformly spaced ultrasound transducers to form a transmit beam and imposes varied amplitude weightings on transmissions from each of said nonuniformly spaced ultrasound transducers.

4. The ultrasonic imaging system of claim 3, wherein said weightings applying means further comprises a receive beam steering circuit which delays signals received by each of said nonuniformly spaced ultrasound transducers to form a receive beam and imposes varied amplitude weightings on said signals received by each of said nonuniformly spaced ultrasound transducers.

5. The ultrasonic imaging system of claim 4, wherein said weightings applying means further comprises a pulser for exciting said nonuniformly spaced ultrasound transducers via said transmit beam steering circuit during said transmit mode, and control means for controlling the timing of said pulser, said transmit beam steering circuit and said receive beam steering circuit.

6. The ultrasonic imaging system of claim 2, wherein said adding means comprises a line buffer for storing said number of component images as complex values and an accumulator for adding successive complex values stored in said line buffer to form sum values of a corresponding line of said sum image.

7. The ultrasonic imaging system of claim 6, further comprising a synchronous demodulator for synchronously demodulating a signal received by said nonuniformly spaced ultrasound transducers, which as received amplitude weightings from said weightings applying means, into in-phase and quadrature components for storage in said line buffer.

8. The ultrasonic imaging system of claim 7, further comprising a scan converter for scan converting said sum image into a raster scan image for display, and a display device for displaying said raster scan image.

9. The ultrasonic imaging system of claim 2, wherein said adding means comprises a line buffer for storing said number of component images as complex values, a scan converter for converting said stored component images into rectangular images, and a complex image accumulator for adding said rectangular images on a point by point basis to form a sum image for display.

10. The ultrasonic imaging system of claim 9, further comprising a synchronous demodulator for synchronously demodulating a signal received by said nonuniformly spaced ultrasound transducers, which has received amplitude weightings from said weightings applying means, into in-phase and quadrature components for storage in said line buffer.

11. The ultrasonic imaging system of claim 10, further comprising a display device for displaying said scan converted sum image.

12. The ultrasonic imaging system of claim 2, wherein said weightings applying means varies said amplitude weightings during said transmit and receive modes from image to image.

13. The ultrasonic imaging system of claim 2, wherein said weightings applying means applies said amplitude weightings to said nonuniformly spaced ultrasound transducers to form a pair of symmetrical point spread functions for the component images.

14. The ultrasonic imaging system of claim 2, wherein said phased array of nonuniformly spaced ultrasound transducers is symmetrical.

15. The ultrasonic imaging system of claim 2, wherein said phased array of nonuniformly spaced ultrasound transducers has a number of transducers N which is greater than 1/x times the number of transducers L of said phased array of substantially uniformly spaced transducers with said designated aperture, where $N<L$, and said adding means adds x component images to form said sum image.

16. The ultrasonic imaging system of claim 2, wherein said phased array of nonuniformly spaced ultrasound transducers comprises first and second subarrays with at least a single transducer element in common, said component images being formed by each of said subarrays.

17. A synthetic aperture ultrasonic imaging system for imaging a target with a resolution limited by a designated aperture, comprising:
- a phased array of nonuniformly spaced ultrasound transducers having an average inter-transducer spacing which is greater than a $\lambda/2$ Nyquist spacing for said transducers, said phased array of nonuniformly spaced ultrasound transducers providing coarray equivalence to a phased array of transducers which are substantially uniformly spaced at said $\lambda/2$ Nyquist spacing to provide said designated aperture for forming a single image having a desired point spread function;
- a phased subarray of ultrasound transducers within said phased array of nonuniformly spaced ultrasound transducers, said phased subarray of ultrasound transducers being substantially uniformly spaced at said $\lambda/2$ Nyquist spacing to provide a reduced aperture for forming an image;
- means for applying first amplitude weightings to ultrasound transducers of said phased array of nonuniformly spaced ultrasound transducers during a first mode to obtain component images of a wide aperture image and for applying second amplitude weightings to ultrasound transducers of said subarray during a second mode to obtain a narrow aperture image;
- means for adding said component images, when received, on a point by point basis to form a sum image representing said wide aperture image during said first mode, whereby a point spread function of said sum image is substantially equivalent to the desired point spread function of said single image formed by said phased array of uniformly spaced transducers; and
- a display for displaying said sum image and said narrow aperture image.

18. A method of imaging a target using ultrasound with a resolution limited by a designated aperture, comprising the steps of:
- applying amplitude weightings to each transducer of a phase array of nonuniformly spaced ultrasound transducers during transmit and receive modes to form a number of component images, said nonuniformly spaced ultrasound transducers having an average inter-transducer spacing which is greater than a $\lambda/2$ Nyquist spacing for said transducers;
- adding said component images on a point by point basis to form a sum image which has a point spread function which more closely approximates a desired point spread function which is unattainable by a single image taken by said nonuniformly spaced ultrasound transducers; and
- displaying said sum image.

19. A method of imaging a target using ultrasound with a resolution limited by a designated aperture, comprising the steps of:
- applying amplitude weightings to each transducer of a phased array of nonuniformly spaced ultrasound transducers during transmit and receive modes so as to form a number of component images, said nonuniformly spaced ultrasound transducers having an average inter-transducer spacing which is greater than a $\lambda/2$ Nyquist spacing for said transducers, and said phased array of nonuniformly spaced ultrasound transducers providing coarray equivalence to a phased array of transducers which are substantially uniformly spaced at said $\lambda/2$ Nyquist spacing to provide said designated aperture for forming a single image having a desired point spread function;
- adding said component images on a point by point basis to form a sum image, a point spread function of said sum image being substantially equivalent to the desired point spread function of said single image formed by said substantially uniformly spaced transducers with said designated aperture; and
- displaying said sum image.

20. The imaging method of claim 19, wherein said weightings applying step comprises the steps of imposing transmit delays between respective ones of said nonuniformly spaced ultrasound transducers to form a transmit beam and imposing varied amplitude weightings on transmissions from each of said nonuniformly spaced ultrasound transducers.

21. The imaging method of claim 20, wherein said weightings applying step further comprises the steps of delaying signals received by each of said nonuniformly spaced ultrasound transducers to form a receive beam and imposing varied amplitude weightings on said signals received by each of said nonuniformly spaced ultrasound transducers.

22. The imaging method of claim 21, wherein said weightings applying step further comprises the step of exciting said nonuniformly spaced ultrasound transducers during said transmit mode.

23. The imaging method of claim 19, wherein said adding step comprises the steps of storing said number of component images as complex values in a line buffer and accumulating successive complex values stored in said line buffer to form sum values of a corresponding line of said sum image.

24. The imaging method of claim 23, further comprising the step of synchronously demodulating a signal received by said nonuniformly spaced ultrasound transducers, which has received amplitude weightings in said weightings applying step, into in-phase and quadrature components prior to storage in said line buffer.

25. The imaging method of claim 24, comprising the further step of scan converting said sum image into a raster scan image for display.

26. The imaging method of claim 19, wherein said adding step comprises the steps of storing said number of component images as complex values in a line buffer, scan converting said stored component images into rectangular images, and adding said rectangular images on a point by point basis to form a sum image for display.

27. The imaging method of claim 26, further comprising the step of synchronously demodulating a signal received by said nonuniformly spaced ultrasound transducers, which has received amplitude weightings during said weightings applying step, into in-phase and quadrature components for storage in said line buffer.

28. The imaging method of claim 19, wherein said weightings applying step comprises the step of varying said amplitude weightings during said transmit and received modes from image to image.

29. The imaging method of claim 19, wherein said weightings applying step comprises the step of applying said amplitude weightings to said nonuniformly spaced ultrasound transducers to form a pair of symmetrical point spread functions for the component images.

30. The imaging method of claim 19, wherein said weightings applying step comprises the step of applying said amplitude weightings to a minimum number of said nonuniformly spaced ultrasound transducers which retain coarray equivalence to said substantially uniformly spaced transducers with said designated aperture, said minimum number being unique for said designated aperture.

31. The imaging method of claim 30, wherein when said minimum number of nonuniformly spaced transducers which retain coarray equivalence to said substantially uniformly spaced N transducers with said designated aperture when L component images are formed and added in said adding step are used, the amplitude weightings to said minimum number of transducers are determined by performing the further step of calculating a synthesized weight $W_s$ at an $i^{th}$ coarray point of said composite image in accordance with the following equation:

$$W_s(i) = \sum_{n=1}^{L} \sum_{k=1}^{N} W_{t,n}(k) W_{r,n}(i - k),$$

where $W_{t,n}(k)$ is a transmit amplitude weight on a $k^{th}$ transducer of said nonuniformly spaced transducers used for the formation of an $n^{th}$ line of said sum image and $W_{r,n}(k)$ is a receive amplitude weight on a $k^{th}$ transducer of said nonuniformly spaced transducers used for the formation of the $n^{th}$ line of said sum image, where $W_{t,n}(k)=0$, if $k<1$ or $k>N$ and $W_{r,n}(k)=0$, if $k<1$ or $k>N$, for all n.

32. A method of imaging a target with a resolution limited by a designated aperture, comprising the steps of:

applying during a first mode first amplitude weightings to ultrasound transducers of a phase array of nonuniformly spaced ultrasound transducers having an average inter-transducer spacing which is greater than a λ/2 Nyquist spacing for said transducers, said phased array of nonuniformly spaced ultrasound transducers providing coarray equivalence to a phased array of transducers which are substantially uniformly spaced at said λ/2 Nyquist spacing to provide said designated aperture for forming a single image having a desired point spread function, thereby obtaining component images of a wide aperture image;

applying during a second mode second amplitude weightings to ultrasound transducers of a phased subarray of ultrasound transducers within said phased array of nonuniformly spaced ultrasound transducers, said phased subarray of ultrasound transducers being substantially uniformly spaced at said λ/2 Nyquist spacing to provide a reduced aperture for forming an image, thereby obtaining a narrow aperture image;

adding said component images, when received, on a point by point basis to form a sum image representing said wide aperture image during said first mode, whereby a point spread function of said sum image is substantially equivalent to the desired point spread function of said single image formed by said phased array of uniformly spaced transducers; and displaying said sum image and said narrow aperture image.

* * * * *

UNITED STATES PATENT AND TRADEMARK OFFICE
CERTIFICATE OF CORRECTION

Page 1 of 2

PATENT NO. : 5,278,757
DATED : January 11, 1994
INVENTOR(S) : Hoctor, et al.

It is certified that error appears in the above-identified patent and that said Letters Patent is hereby corrected as shown below:

Column 1, line 30, insert a period after "scene".

Column 2, line 15, insert a period after "elements".

Column 5, line 33, delete the comma after "image".

Column 8, line 57, change "a($\tilde{u}$)" to --$\tilde{a}$(u)--.

Column 10, line 16, change "oz" to --of--.

Column 10, line 32, change "Az" to --As--.

Column 10, line 46, insert a period after "demonstrate".

Column 11, line 64, change "$N_t$" (first occurrence) to --$N_r$--.

Column 11, line 66, change "transit" to --transmit--.

Column 13, line 44, change "$C_{f,g}$" to --$C_{f,9}$--.

Column 13, line 46, delete "4-" before "element".

Column 14, line 3, change "N," to --$N_r$--.

Column 14, line 59, change "$C_{f,g}$" to --$C_{f,9}$--.

Column 16, line 38, capitalize "antennas".

UNITED STATES PATENT AND TRADEMARK OFFICE
CERTIFICATE OF CORRECTION

Page 2 of 2

PATENT NO. : 5,278,757
DATED : January 11, 1994
INVENTOR(S) : Hoctor, et. al.

It is certified that error appears in the above-indentified patent and that said Letters Patent is hereby corrected as shown below:

Column 16, line 39, change "5" to --15-- and change "Where" to --where--.

Column 18, line 65, insert a period after "image".

Column 19, line 25, insert a period after "defined".

Column 19, line 27, change "elementwise" to --element-wise--.

Column 21, line 53, insert a period after "point".

Column 24, line 17, change "as" to --has--.

Column 28, line 2, change "phase" to --phased--.

Signed and Sealed this

Eleventh Day of October, 1994

Attest:

BRUCE LEHMAN

*Attesting Officer*  *Commissioner of Patents and Trademarks*